US012807488B2

(12) United States Patent
Jangbarwala et al.

(10) Patent No.: US 12,807,488 B2
(45) Date of Patent: Nov. 24, 2026

(54) REACTOR AND PROCESS FOR PRODUCING CARBONACEOUS MATERIALS

(71) Applicant: PACT FUEL, LLC, Darien, CT (US)

(72) Inventors: Juzer Jangbarwala, Chino Hills, CA (US); Aram Sarkissian, Santa Clarita, CA (US)

(73) Assignee: PACT FUEL, LLC, Darien, CT (US)

( * ) Notice: Subject to any disclaimer, the term of this patent is extended or adjusted under 35 U.S.C. 154(b) by 379 days.

(21) Appl. No.: 18/580,769

(22) PCT Filed: Jul. 26, 2022

(86) PCT No.: PCT/US2022/038362
§ 371 (c)(1),
(2) Date: Jan. 19, 2024

(87) PCT Pub. No.: WO2023/009532
PCT Pub. Date: Feb. 2, 2023

(65) Prior Publication Data
US 2024/0391766 A1 Nov. 28, 2024

Related U.S. Application Data

(60) Provisional application No. 63/225,918, filed on Jul. 26, 2021.

(51) Int. Cl.
*C01B 3/28* (2026.01)
*B01J 8/00* (2006.01)
(Continued)

(52) U.S. Cl.
CPC ................. *C01B 3/28* (2013.01); *B01J 8/005* (2013.01); *B01J 8/1827* (2013.01);
(Continued)

(58) Field of Classification Search
CPC ... C01B 3/28; C01B 2203/0277; C01B 32/05; C01B 32/158; C01B 32/159;
(Continued)

(56) References Cited

U.S. PATENT DOCUMENTS

| | | | |
|---|---|---|---|
| 4,646,637 | A | 3/1987 | Cloots |
| 4,705,908 | A | 11/1987 | Gondouin |

(Continued)

FOREIGN PATENT DOCUMENTS

| | | |
|---|---|---|
| CA | 3083261 | 6/2018 |
| CN | 101883627 | 11/2010 |

(Continued)

OTHER PUBLICATIONS

Machine Translation of HU 196717 to Hajdu, et al. (Jan. 30, 1989;) (Year: 1989).*

(Continued)

*Primary Examiner* — Daniel C. Mccracken
(74) *Attorney, Agent, or Firm* — Sheridan Ross PC

(57) ABSTRACT

In embodiments of this disclosure, a rotating media fluidized bed reactor for the decomposition of a gaseous hydrocarbon into nanofibers and other carbonaceous materials and hydrogen having a stationary or rotating distributor comprises a substantially hollow gas impermeable structure in fluid communication with one or more peripheral gas distributors to create a slip velocity vortex of reactant gas flow around the gas impermeable structure.

21 Claims, 29 Drawing Sheets

(51) Int. Cl.
*B01J 8/18* (2006.01)
*D01F 9/127* (2006.01)
*D01F 9/133* (2006.01)

(52) U.S. Cl.
CPC ............ *D01F 9/1272* (2013.01); *D01F 9/133* (2013.01); *B01J 2208/00761* (2013.01); *B01J 2208/00938* (2013.01); *C01B 2203/0277* (2013.01)

(58) Field of Classification Search
CPC ..... C01B 32/16; C01B 32/162; C01B 32/164; C01B 32/166; C01B 32/168; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; C01B 32/182; C01B 32/184; C01B 32/186; C01B 32/188; C01B 32/19; C01B 32/192; C01B 32/194; C01B 32/196; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; C01B 32/15; C01B 32/18; C01B 32/152; C01B 32/154; C01B 32/156; B01J 8/005; B01J 8/1827; B01J 2208/00761; B01J 2208/00938; B01J 2208/00752; B01J 2208/00902; B01J 8/0055; B01J 8/1818; B01J 8/386; B01J 8/44; B01J 8/38; D01F 9/1272; D01F 9/133; D01F 9/12; D01F 9/127; D01F 9/1271; D01F 9/1273; D01F 9/1274; D01F 9/1275; D01F 9/1276; D01F 9/1277; D01F 9/1278; C10G 11/18; C07C 2/00
See application file for complete search history.

(56) References Cited

U.S. PATENT DOCUMENTS

| | | | | | |
|---|---|---|---|---|---|
| 4,970,804 | A * | 11/1990 | Huttlin | B01J 8/44 | |
| | | | | 34/589 | |
| 6,413,487 | B1 * | 7/2002 | Resasco | D01F 9/1272 | |
| | | | | 427/249.1 | |
| 6,919,064 | B2 * | 7/2005 | Resasco | B01J 8/388 | |
| | | | | 977/843 | |
| 7,459,138 | B2 * | 12/2008 | Resasco | D01F 9/127 | |
| | | | | 977/843 | |
| 2002/0007594 | A1 | 1/2002 | Muradov | | |
| 2003/0047437 | A1 | 3/2003 | Stankevitch | | |
| 2004/0209773 | A1 | 10/2004 | Kobayashi et al. | | |
| 2005/0065024 | A1 | 3/2005 | Wang et al. | | |
| 2006/0057054 | A1 * | 3/2006 | Fujioka | D01F 9/127 | |
| | | | | 422/600 | |
| 2006/0104887 | A1 | 5/2006 | Fujioka et al. | | |
| 2009/0223862 | A1 | 9/2009 | MacDonald | | |
| 2009/0291030 | A1 | 11/2009 | Edwin et al. | | |
| 2010/0197879 | A1 | 8/2010 | De Broqueville et al. | | |
| 2011/0038775 | A1 | 2/2011 | Takahashi et al. | | |
| 2014/0121426 | A1 | 5/2014 | Tandon | | |
| 2015/0080624 | A1 | 3/2015 | Gephart et al. | | |
| 2016/0024390 | A1 | 1/2016 | Ullom | | |
| 2019/0006151 | A1 | 1/2019 | Paukner et al. | | |
| 2022/0184855 | A1 | 6/2022 | Mleczko et al. | | |
| 2022/0195315 | A1 | 6/2022 | Zhang | | |
| 2022/0204870 | A1 | 6/2022 | Portela et al. | | |
| 2023/0002681 | A1 | 1/2023 | Badiola et al. | | |
| 2024/0326023 | A1 | 10/2024 | Jangbarwala et al. | | |
| 2024/0368479 | A1 | 11/2024 | Jangbarwala et al. | | |
| 2024/0391766 | A1 | 11/2024 | Jangbarwala et al. | | |

FOREIGN PATENT DOCUMENTS

| | | | | |
|---|---|---|---|---|
| CN | 104073279 | | 10/2014 | |
| CN | 105542829 | | 5/2016 | |
| CN | 110624483 | | 12/2019 | |
| CN | 111676042 | | 9/2020 | |
| CN | 112126453 | | 12/2020 | |
| EP | 0381870 | | 8/1990 | |
| HU | 196717 | * | 1/1989 | F26B 3/0923 |
| JP | 2009-062271 | | 3/2009 | |
| WO | WO 2009/126769 | | 10/2009 | |
| WO | WO 2012/068781 | | 5/2012 | |
| WO | WO 2019/098658 | | 5/2019 | |
| WO | WO 2023/009398 | | 2/2023 | |
| WO | WO 2023/009532 | | 2/2023 | |
| WO | WO 2023/009540 | | 2/2023 | |
| WO | WO 2024/054914 | | 3/2024 | |

OTHER PUBLICATIONS

Dasgupta, et al., Fluidized bed synthesis of carbon nanotubes—A review, Chemical Engineering Journal 2011; 171: 841-869 (Year: 2011).*
Written Opinion of the International Search Authority in PCT/US22/38362 (Oct. 13, 2022) (Year: 2022).*
U.S. Appl. No. 19/109,440, filed Mar. 6, 2025, Jangbarwala et al.
Dussault et al., "Development of Ni—Cu—Mg—Al catalysts for the synthesis of carbon nanofibers by catalytic decomposition of methane," Journal of Catalysis, vol. 251, No. 1, Sep. 7, 2007, pp. 223-232.
Scheirs, "Chapter 15: Overview of Commercial Pyrolysis Processes for Waste Plastics," in "Feedstock Recycling and Pyrolysis of Waste Plastics: Converting Waste Plastics Into Diesel and Other Fuels," John Wiley & Sons, Ltd., West Sussex, UK, 2006, pp. 383-431.
Extended European Search Report for Europe Patent Application No. 22850116.9, dated Apr. 15, 2025, 8 pages.
Extended European Search Report for Europe Patent Application No. 22850195.3, dated May 16, 2025, 7 pages.
Extended European Search Report for Europe Patent Application No. 22850190.4, dated May 12, 2025, 7 pages.
International Preliminary Report on Patentability for International (PCT) Patent Application No. PCT/US2023/073644, dated Mar. 20, 2025, 8 pages.
Official Action (with English translation) for China Patent Application No. 202280052566.1, dated Mar. 28, 2026, 8 pages.
Official Action for U.S. Appl. No. 18/580,761, dated May 28, 2026, 6 pages. Restriction Requirement.
International Search Report and Written Opinion for International (PCT) Patent Application No. PCT/US2022/038373, dated Dec. 7, 2022, 11 pages.
International Search Report and Written Opinion for International (PCT) Patent Application No. PCT/US2022/038362, dated Oct. 13, 2022, 8 pages.
U.S. Appl. No. 18/580,753, filed Jan. 19, 2024, Jangbarwala et al.
U.S. Appl. No. 18/580,761, filed Jan. 19, 2024, Jangbarwala et al.
International Search Report and Written Opinion for International (PCT) Patent Application No. PCT/US2022/038063, dated Oct. 7, 2022, 8 pages.
International Preliminary Report on Patentability for International (PCT) Patent Application No. PCT/US2022/038063, dated Feb. 8, 2024, 7 pages.
International Preliminary Report on Patentability for International (PCT) Patent Application No. PCT/US2022/038373, dated Feb. 8, 2024, 8 pages.

(56) References Cited

OTHER PUBLICATIONS

International Preliminary Report on Patentability for International (PCT) Patent Application No. PCT/US2022/038362, dated Feb. 8, 2024, 8 pages.
International Search Report and Written Opinion for International (PCT) Patent Application No. PCT/US2023/073644, dated Dec. 19, 2023, 14 pages.
Aguado et al., “Chapter 3: Catalytic Upgrading of Plastic Wastes,” in in “Feedstock Recycling and Pyrolysis of Waste Plastics: Converting Waste Plastics Into Diesel and Other Fuels,” (eds. Scheirs et al.) John Wiley & Sons, Ltd., West Sussex, UK, 2006, pp. 73-110.
Official Action for China Patent Application No. 202280052404.8, dated Feb. 12, 2026, 3 pages.
Official Action for U.S. Appl. No. 18/580,753, dated Nov. 28, 2025, 26 pages.
Official Action (with English translation) for Japan Patent Application No. 2024-504955, dated Aug. 18, 2026, 4 pages.

* cited by examiner

REACTOR AND PROCESS FOR PRODUCING CARBONACEOUS MATERIALS

CROSS REFERENCE TO RELATED APPLICATION

This application is a national stage application under 35 U.S.C. 371 and claims the benefit of PCT Application No. PCT/US2022/038362 having an international filing date of 26 Jul. 2022, which designated the United States, and which PCT application claimed the benefit of U.S. Provisional Application Ser. No. 63/225,918, filed Jul. 26, 2021, entitled "Reactor and Process for Producing Carbonaceous Materials", the contents of each of which are incorporated herein by reference in their entireties.

CROSS REFERENCE TO RELATED APPLICATION

The present application claims the benefits of U.S. Provisional Application Ser. No. 63/225,918, filed Jul. 26, 2021, entitled "Reactor and Process for Producing Carbonaceous Materials", which is incorporated herein by this reference in its entirety.

FIELD

The disclosure relates generally to a reactor as well as a process for producing carbonaceous materials and particularly to a reactor and process for producing carbon nanomaterial, specifically carbon nanofiber materials.

BACKGROUND

The thermal decomposition of methane to carbon and hydrogen gas, illustrated by reaction scheme (1) below, is a moderately endothermic process, but its energy requirement per mole of carbon produced (75.6 kJ/mol) is considerably less than that required by steam reforming processes (about 190 kJ/mol). Additionally, unlike steam reforming, the hydrogen produced by thermal decomposition of methane can be produced in an oxygen-free environment and does not involve a water-gas shift reaction, and the reaction can therefore produce both high-purity carbon and a hydrogen gas stream that is free of carbon monoxide.

$$CH_4+75.6\text{ kJ/mol}\rightarrow C+2\,H_2$$

Thermal decomposition of natural gas has long been used to produce carbon black, with the resulting hydrogen gas being used as a supplementary fuel for the process. These processes are usually practiced in a semi-continuous fashion using two tandem reactors at high operational temperatures (typically about 1,400° C.), but those skilled in the art have attempted to reduce these operating temperatures via catalysis. Data on the catalytic decomposition of methane using aluminum-, cobalt-, chromium-, iron-, nickel-, platinum-, palladium-, and rhodium-based catalysts have been reported in the literature; see, e.g., Marina A. Ermakova et al., "Decomposition of methane over iron catalysts at the range of moderate temperatures: the influence of structure of the catalytic systems and the reaction conditions on the yield of carbon and morphology of carbon filaments," 201(2) *Journal of Catalysis* 183 (July 2001), the entirety of which is incorporated herein by reference.

Directly catalyzed decomposition of methane offers two major advantages over thermal decomposition: (i) the operational temperature can be dramatically lowered, from about 1,400° C. to at least as low as about 550° C., thereby significantly reducing the energy input requirements of the process, and (ii) various engineered carbon nanostructures of high value can also be generated by the judicial use of catalysts, thereby increasing the commercial value of the process. Because natural gas is widely available in large quantities, catalytic decomposition of methane to produce hydrogen gas and high-value carbon nanostructures on an industrial scale is technically feasible. However, for this decomposition process to be of practical, (i.e., commercial and financial) significance, highly effective catalysts, which heretofore have been unavailable, are required. Such catalysts should exhibit high activity for a prolonged period of time and continue to function in the presence of high concentrations of accumulated carbon.

Additionally, catalytic decomposition of methane can be a capricious process due to exacting requirements for metal particle size and the tendency of the reaction conditions to have a detrimental effect on catalyst morphology. Previous work has shown that the highest yields of solid carbon are obtained where the average particle size of the catalyst is about 30 to 40 nm, but also that nickel catalyst particles may undesirably aggregate as soon as the catalyst comes into contact with methane; see, e.g., M. A. Ermakova et al., "XRD studies of evolution of catalytic nickel nanoparticles during synthesis of filamentous carbon from methane," 62(2) *Catalysis Letters* 93 (October 1999), the entirety of which is incorporated herein by reference. This particle sintering behavior results in a reduction of catalytic activity. Thus, while the concept of generating carbon and hydrogen by catalyzed decomposition of methane has attracted intense interest and demonstrated technical feasibility, consistent achievement of a desired high-quality carbonaceous product has been difficult to achieve; many previous approaches in the art have failed to provide any degree of control over the type of carbon nanomaterials produced, and as a result the carbonaceous products of these approaches must be purified by chemical and physical processes that are typically difficult, expensive, and/or time-consuming, making them impractical for commercial applications.

Further, most catalytic cracking of methane and other solid carbon production reactors are the fixed bed type and have many disadvantages:

a) endothermic reactions lower the surface temperature of catalysts, resulting in a slow to rapid formation of carbon solids on the active face of the catalysts, thereby inactivating the catalyst. This finally translates in very low yields and renders the reactor configuration inappropriate for the production of solid carbon structures.
b) stationary catalyst particles get covered by the solid carbon nanomaterials, decreasing the driving force for the carbon molecule to chemisorb on the catalyst surface.

SUMMARY

These and other needs are addressed by the various aspects, embodiments, and configurations of the present disclosure.

In an embodiment of the disclosure, a rotating media fluidized bed reactor can include:

a. an inlet for a hydrocarbon-containing gas;
b. a gas impermeable structure comprising a continuous sidewall and hollow interior volume to receive the hydrocarbon-containing gas;
c. plural gas distributors positioned around a periphery of the gas impermeable structure and in fluid communication with the hollow interior to receive at least most of the hydrocarbon-containing gas from the hollow interior volume and discharge the hydrocarbon-containing gas in a reaction zone located exteriorly to the gas impermeable structure to create a vortex fluid flow, the reaction zone comprises suspended catalyst particles to cause decomposition of hydrocarbons in the hydrocarbon-containing gas to form a carbonaceous material; and d. an exit gas conduit to receive a reacted gas, the exit gas conduit having an inlet positioned substantially at an axis of the vortex fluid flow.

In an embodiment of the disclosure, a method can include the steps of:

a. introducing a hydrocarbon-containing gas into an inlet of a rotating media fluidized bed reactor, the fluidized bed reactor comprising:
b. a gas impermeable structure comprising a continuous sidewall and hollow interior volume to receive the hydrocarbon-containing gas; and
c. a gas distributor positioned at a periphery of the gas impermeable structure and in fluid communication with the hollow interior to receive at least most of the hydrocarbon-containing gas from the hollow interior volume and discharge the hydrocarbon-containing gas into a reaction zone located exteriorly to the gas impermeable structure to create a vortex fluid flow, the reaction zone comprising suspended catalyst particles to cause decomposition of hydrocarbons in the hydrocarbon-containing gas to form a carbonaceous material;
d. removing a reacted gas from an exit gas conduit of the reactor; and
e. removing a composite material comprising carbonaceous product and catalyst particles from the reactor.

In an embodiment of the disclosure, a rotating media fluidized bed reactor can include:

a. an inlet for a hydrocarbon-containing gas;
b. a gas impermeable structure comprising a continuous sidewall and hollow interior volume to receive the hydrocarbon-containing gas;
c. a gas distributor positioned near a periphery of the gas impermeable structure and in fluid communication with the hollow interior to receive at least most of the hydrocarbon-containing gas from the hollow interior volume and discharge the hydrocarbon-containing gas in a reaction zone located exteriorly to the gas impermeable structure to create a vortex fluid flow, the reaction zone comprises suspended catalyst particles to cause decomposition of hydrocarbons in the hydrocarbon-containing gas to form a carbonaceous material; and
d. an exit gas conduit to receive a reacted gas, the exit gas conduit having an inlet positioned substantially at an axis of the vortex fluid flow.

The gas impermeable structure can have a number of three dimensional shapes. For example, the gas impermeable structure can comprise a polygonal prism, wherein the sidewall is a surface of the polygonal prism. The gas impermeable structure can comprise an arcuate sidewall, such as the sidewall of a cone or frustoconical prism While any reaction can occur in the reactor system, the reactor and method are typically used to catalytically decompose hydrocarbon in the hydrocarbon-containing gas into carbon nanofibers and hydrogen gas.

The gas distributor can be stationary and comprise multiple gas distributors positioned substantially uniformly around a periphery of the gas impermeable structure.

The gas distributor can be rotatable and rotate about a longitudinal axis of the reactor and/or gas impermeable structure.

To assist the vortex flow pattern and provide better catalyst particle suspension, each gas distributor can include an upwardly angled ramp surface to direct the discharged hydrocarbon-containing gas upwardly along a path of flow transverse to a central axis of the reactor and/or tangential to the continuous sidewall of the gas impermeable structure. Each of the plural gas distributors comprises an inlet and outlet, each of which can be oriented in a substantially vertical plane to avoid orifice blockage, and a passage interconnecting the inlet and outlet, and the passage can have an arcuate central axis.

The operating conditions of the reactor system depend on the particular implementation. Typically, the operating conditions comprise: a pressure of the hydrocarbon-containing gas ranging from about 5000 Pa to about 50,000 Pa, a first velocity of the hydrocarbon-containing gas in the hollow interior ranging from about 0.5 to about 20 fps, a second velocity of the hydrocarbon-containing gas when discharged from the gas distributor ranging from about 0.5 to about 20 fps, a third velocity of the hydrocarbon-containing gas in the reaction zone ranging from about 0.5 to about 20 fps, a temperature of the hydrocarbon-containing gas in the reaction zone ranging from about 550 to about 750° C., a $P_{90}$ size of the particulate catalyst particles ranging from about 0.1 to about 5.0 microns, and a ratio of a height (H) of the gas impermeable structure: the diameter (D) or width (W) of the gas impermeable structure ranging from about 1:1 to about 6:1.

The reactor can use a bimodal technique to remove carbonaceous products. In a first mode, the gas impermeable structure can be in a first position that is hermetically sealed to enable catalytic decomposition of hydrocarbons and, in a second mode, the gas impermeable structure can be in a different second position that is not hermetically sealed to enable removal of carbonaceous material from the reaction zone.

The reactor can include a gas curtain generator positioned at the inlet to the exit gas conduit to discharge a curtain gas in a direction of flow transverse to a direction of flow of the reacted gas to reduce a velocity of the reacted gas and substantially inhibit entry of entrained catalyst particles into the exit gas conduit.

The present disclosure can provide a number of advantages depending on the particular configuration. For example, vortex flow can provide a higher slip velocity, which provides better heat and mass transfer. The reactor system can inexpensively produce nanofibers as a bulk material. The lengths of the nanofibers can be controlled by controlling the gas velocity in the reaction zone; that is, higher fluidizing gas velocities generally yield shorter nanofiber product lengths due to increased gas turbulence while lower fluidizing gas velocities yield longer nanofiber product lengths. The process can be either a continuous batch process or continuous process depending on the implementation.

These and other advantages will be apparent from the disclosure of the aspects, embodiments, and configurations contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

In embodiments of this disclosure, a stationary chamber rotating media fluidized bed reactor for the decomposition of a gaseous hydrocarbon into nanofibers and other carbonaceous materials and hydrogen is described. The reactor can have a stationary or rotating gas distributor that comprises angled slots and/or precision orifices to create a slip velocity vortex of reactant gas flow around a gas impermeable cone. A "slip velocity vortex refers to a vortex flow pattern comprising the hydrocarbon gas and particulate catalyst providing a slip velocity, or a difference between the velocity of the particulate catalyst and the velocity of the gas phase. In fluid dynamics, a vortex is a region in a fluid in which the flow revolves around an axis line, which may be straight or curved or curvilinear. While the embodiments discussed below are with reference to a stationary gas distribution assembly, it is to be appreciated that the gas distribution assembly may be configured to rotate about the longitudinal axis of reacted gas exit tubing positioned centrally within the reactor.

Figure 1A:
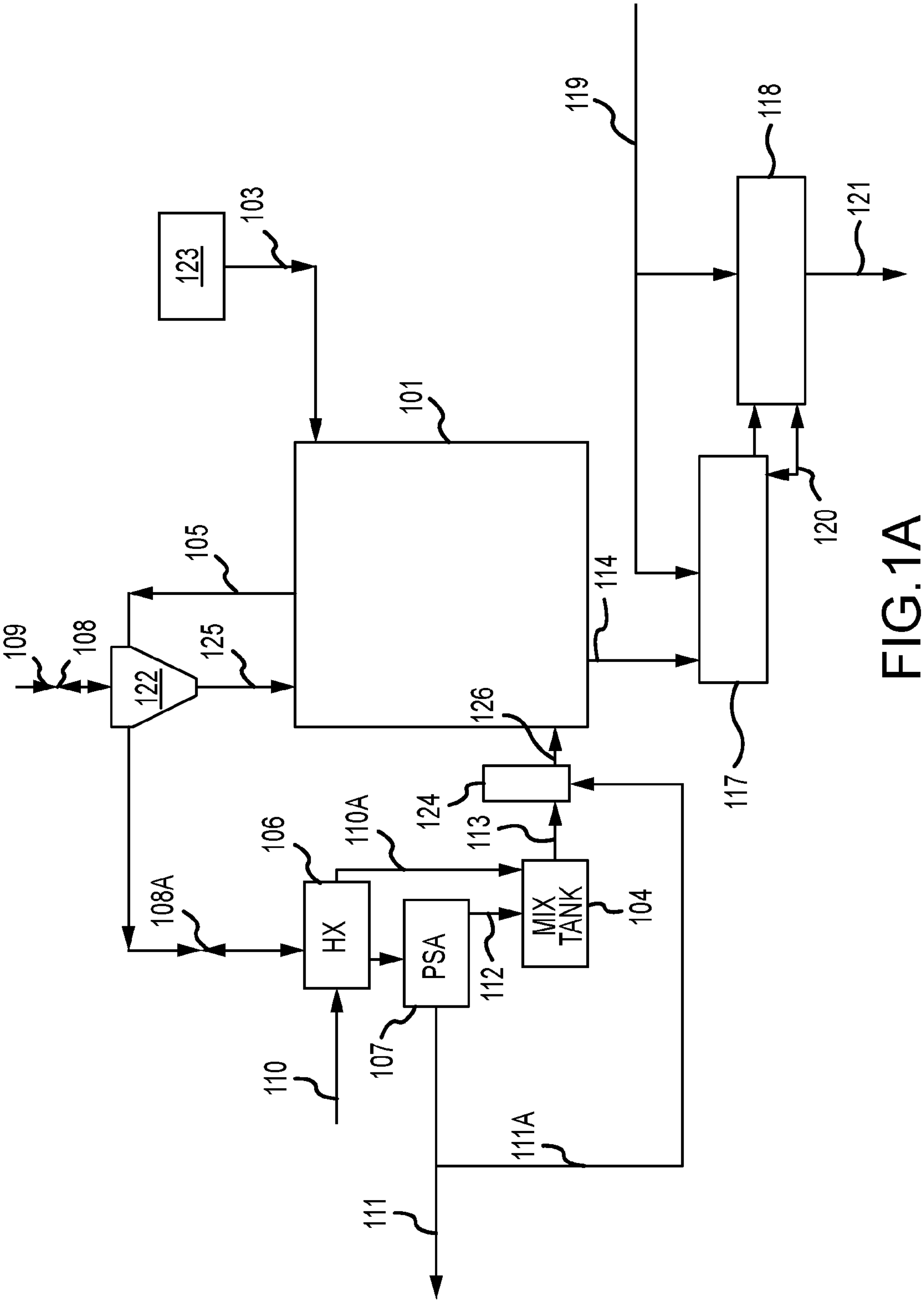
FIG. 1A is a block diagram of a reactor system according to an embodiment of this disclosure.

With reference to FIG. 1A, an embodiment of a hydrocarbon gas decomposition reactor system 100 according to the present disclosure is depicted. The reactor system 100 comprises a reactor 101 discussed in greater detail below in fluid communication with particle separator 122 and heat exchanger (HX) 106 via conduit 105. Fresh hydrocarbon feed 110 is preheated in HX 106 to temperatures amenable for separation. The hydrocarbon gas decomposition reaction selectively produces first intermediate and second intermediate carbonaceous products 125 and 114 from particulate catalyst 123 and hydrocarbon gas 110.

The fresh hydrocarbon gas 110 is first pre heated by the waste heat from the product or reacted gas 105 in HX 106. The pre heated gas 110A then flows to a mixing tank 104 and flows as a mix of new and recovered methane 113 into the preheater 124 where it is heated together with hydrogen 111A partially rerouted from the recovered hydrogen stream 111 from the pressure swing adsorption (PSA). A PSA is a gas separation device well known in the industry and separates a gas species from a mixture of gases under pressure according to the species' molecular characteristics and affinity for an adsorbent material. By controlling the pressure and temperature, specific dew points can be dialed in, retarding the movement of one gas from others. Specifically, in the present disclosure, the product gas 105 from the reactor will be a mixture of hydrogen and unreacted methane. The PSA will route the methane to the mix tank 104, where the recovered methane will be mixed with fresh methane and hydrogen. The mixed gases are pre heated by preheater 124 to reaction temperature and fed to the reactor as a preheated mixed gas stream 126. The hydrocarbon gas can be any gaseous hydrocarbon, with shorter chain hydrocarbon gases, such as a gas from the alkane group (e.g., methane, ethane, propane, butane, pentane, and hexane), being typical and methane more typical. The hydrocarbon gas can also be any gas from the alkene group (carbon to carbon double bond), alkyne group (carbon to carbon triple bond) or an aromatic group. In one embodiment, the hydrocarbon gas comprises at least about 50 mole percent more typically at least about 75 mole percent and even more typically at least about 90 mole percent methane, with the balance being nitrogen, hydrogen or carbon dioxide gases. To avoid oxidation of the carbonaceous material forming on the particulate catalyst 123, the gas within the reactor system 100, including the hydrocarbon gas 110 is at least substantially free of molecular oxygen and other oxidants and typically contains no more than about 0.01 mole % of molecular oxygen and other oxidants.

The particulate catalyst 123 can be any metallic or intermetallic catalyst, such as AL, NI, CU, Co, Cr, Fe, Ni, Pt, Pd, and Rh-based catalysts and alloys of these metals. In one embodiment, the catalyst is an oxide alloy of a basic metal, transition metal, and alkaline earth metal. The particulate catalyst 123 typically has a $P_{90}$ size ranging from about 0.10 to about 5.0 microns.

The particle separator 122 can be any device that can separate gas from entrained particulates. In one implementation, the particle separator 122 is a cyclone separator that uses the principle of inertia to remove entrained particulate matter from an input gas stream. In a cyclone separator, the input gas is fed into a chamber that creates a spiral vortex. The lighter components of this gas have less inertia, so it is easier for them to be influenced by the vortex and travel up it. Contrarily, larger components of particulate matter have more inertia and are not as easily influenced by the vortex. In one implementation, the particle separator 122 is a centrifuge. Like the cyclone, the centrifuge spins objects around a center axis. This spinning pushes harder on dense material than on less dense material which separates objects by their densities.

In some implementations, the particle separator is a housing with cartridge type filter elements 123 that pass the reacted gas as the filtrate but retains entrained particles as the retentate with an automatic backpulse facilitated by preheated hydrogen gas 109 being used to cause the retentate to be removed from the filter media of the cartridges. The filter media can be backpulsed periodically during production of the carbonaceous material with valve 108B open and closing valve 108A, temporarily suspending the fluid connection between the reactor 101 and the heat exchanger 106. The first intermediate carbonaceous solids 125 from the back pulse (filtered solids) are directed back to the reactor chamber.

The mixed hydrocarbon gas 113 and hydrogen 111A are pre heated by the preheater 124 and fed to the reactor 101 where it interacts with the particulate catalyst 123 to form first or second intermediate carbonaceous products 125 and 114. The hydrocarbon gas is typically heated to a temperature ranging from about 550 to about 850° C. and input at a pressure ranging from about 5,000 to about 50,000 Pa and gas velocity ranging from about 0.5 to about 20 fps. The hydrocarbon gas 113 is diffused or distributed substantially in the reactor and suspends or fluidizes the particulate catalyst by forming a vortex flow pattern. Carbonaceous materials, typically carbon nanomaterial and more typically carbon nanofiber materials, grow on the suspended particulate catalyst 123 and, when the materials reach a threshold size, the materials, under the force of the fluidizing gas, break off, are suspended by the fluidizing gas, and, when the fluidizing gas is discontinued, fall to the bottom of the reactor as the second intermediate carbonaceous product. In one implementation, the process is operated under conditions substantially minimizing break off of the material and causing the particulate catalyst 123 and attached carbonaceous material to be removed by the fluidizing gas from the reactor 101 and into the particle separator 122 where they are separated from the gas as the first intermediate carbonaceous product 125. A back pulse on the cartridge type filter elements 123 using hydrogen 109 returns the first intermediate product back to the reactor 101.

Figure 1B:
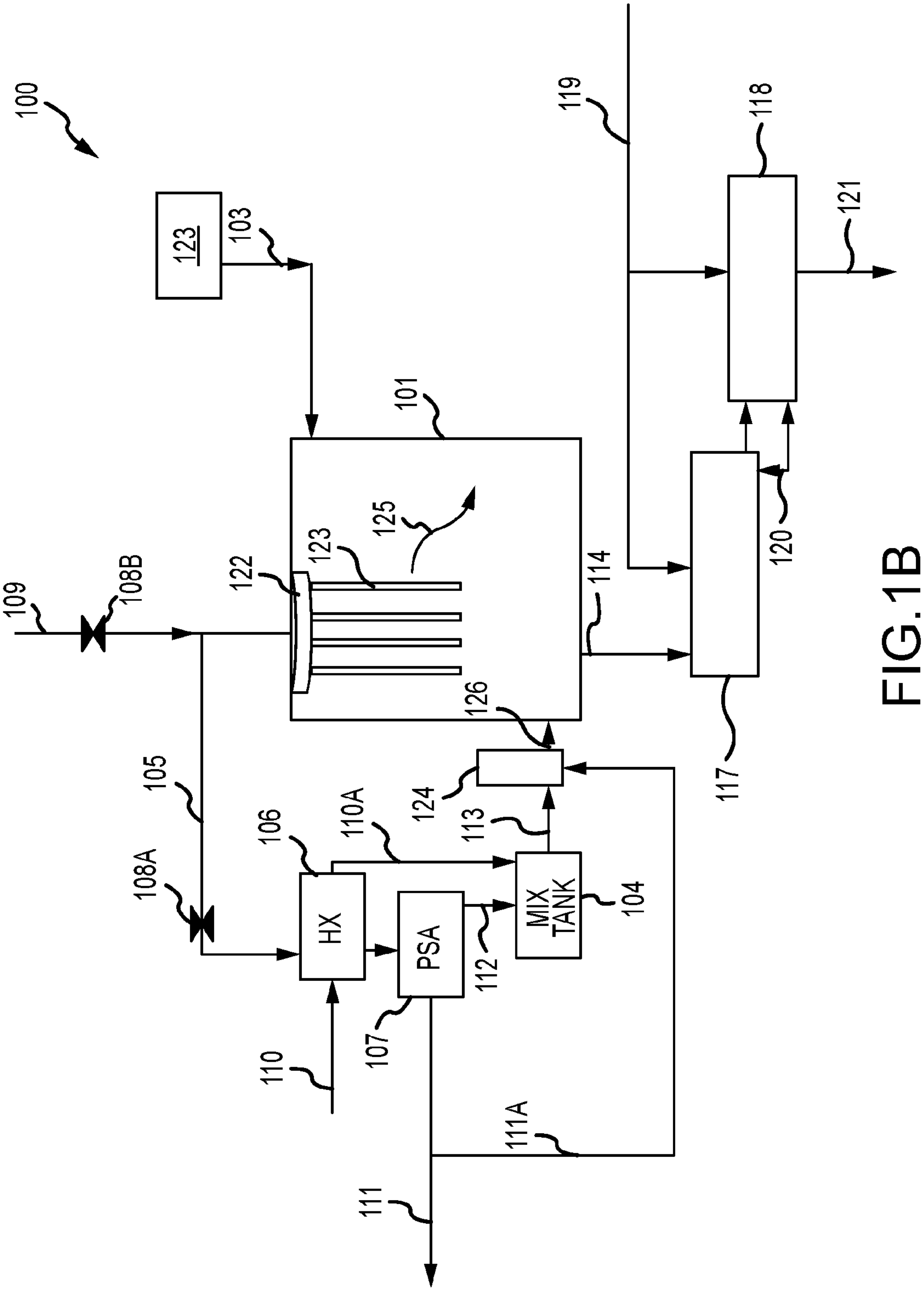
FIG. 1B is a block diagram of a reactor system according to an embodiment of this disclosure.

In another embodiment, the cartridge type filter elements 123 of the particle separator 122 (FIG. 1B) are suspended inside the reactor and the back pulse simply drops the first intermediate carbonaceous product back into the reactor 101. In this embodiment, no external particle separator 122 is typically employed.

Referring again to FIG. 2A to substantially minimize the volume of particles leaving the reactor and into the particle separator 122, a mechanism to inhibit the particulate catalyst 123 and intermediate carbonaceous product from exiting the reactor 101 is provided. Via the gas flow conduit 112, a curtain gas 158 (e.g., a reducing gas such as hydrogen gas or a noble gas) forms a gas curtain, or reverse gas flow, within the conduit 112 to cause a decreased gas velocity. As discussed below, the decreased gas velocity is below the gas velocity required to entrain the particulate catalyst 123 and/or intermediate carbonaceous product, thereby causing the particles to remain in the reactor 101. As will be appreciated, the reverse velocity of the curtain gas 158 is less than the exit velocity of the gas in the gas flow conduit 112, more typically is no more than about 75%, and even more typically no more than about 50% of the exit velocity.

Figure 2A:
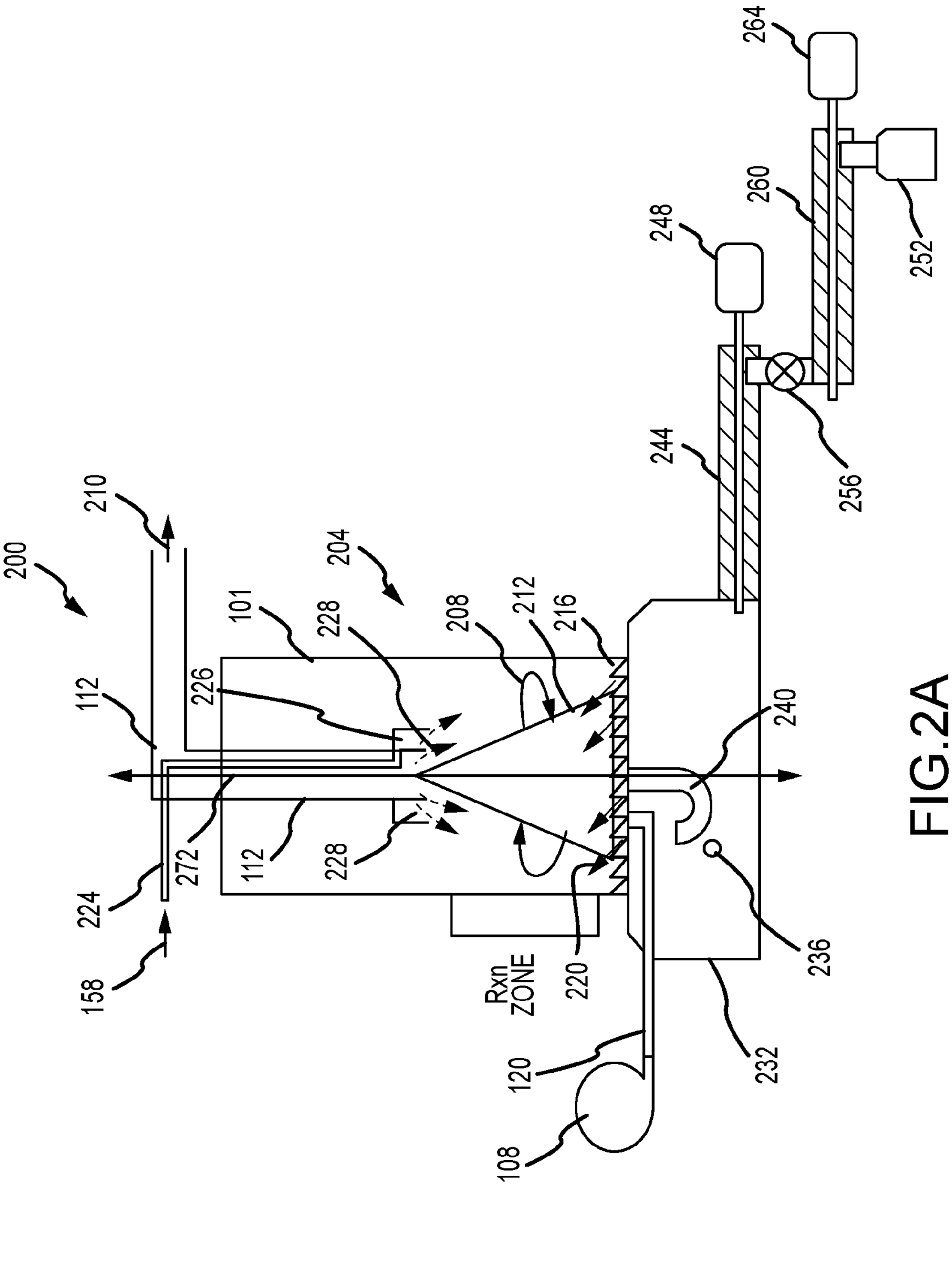
FIG. 2A is a schematic of the embodiment of FIG. 1.
Figure 2B:
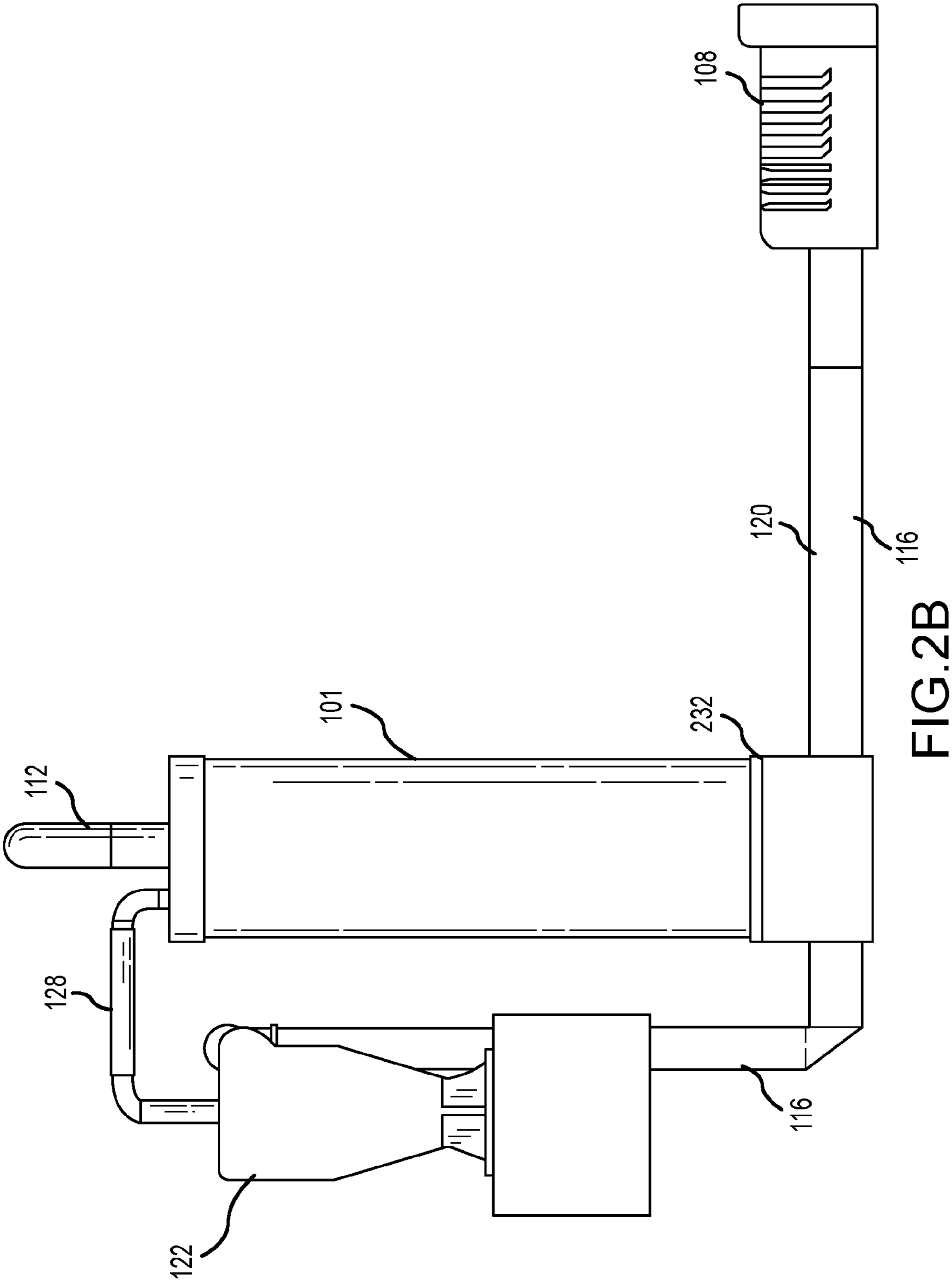
FIG. 2B is a front view of a reactor system according to the embodiment of FIG. 1.
Figure 3:
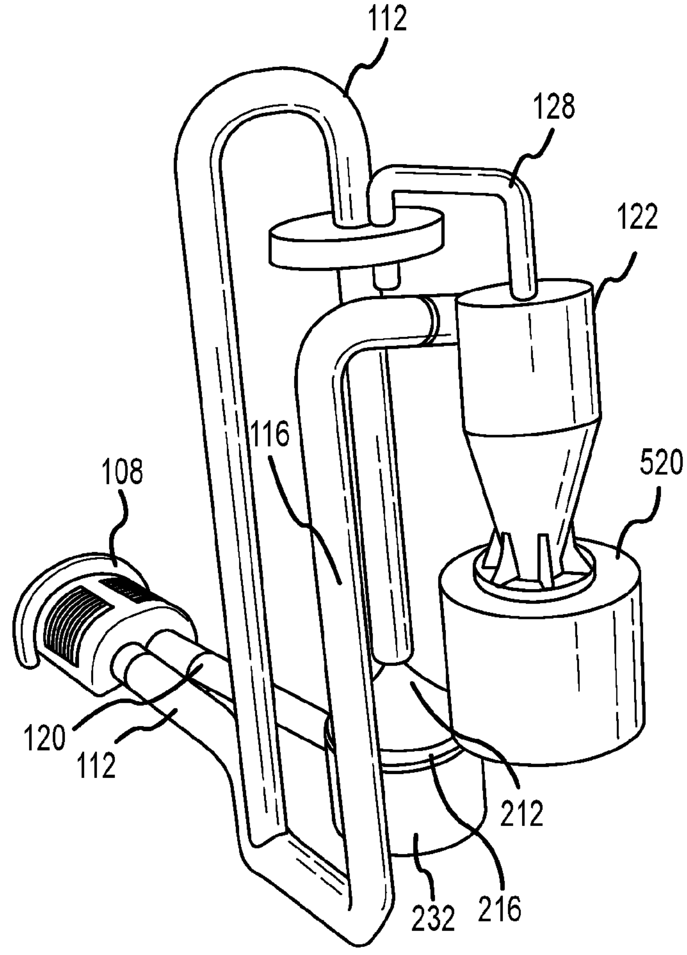
FIG. 3 is a rear perspective view of the reactor system of FIG. 2B (with the reactor housing sidewall omitted)
Figure 4:
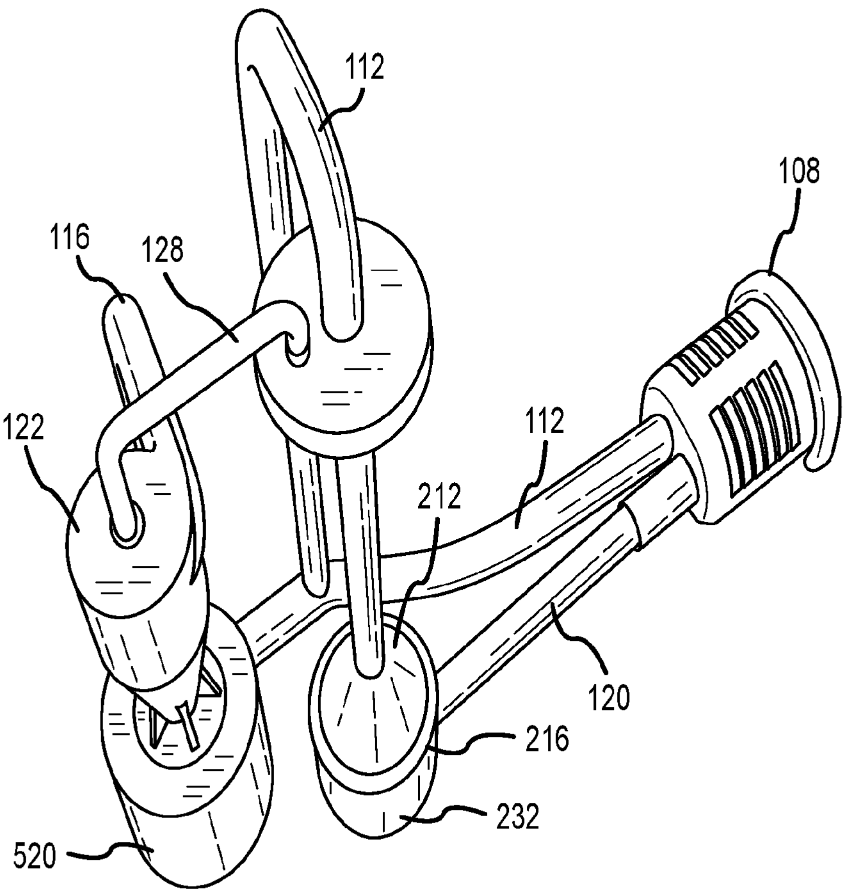
FIG. 4 is a top perspective view of the reactor system of FIG. 2B (with the reactor housing sidewall omitted)

Referring now to FIG. 2A, a more detailed embodiment of a reactor system 200 is depicted.

An input gas compressor or blower 108 feeds preheated hydrocarbon gas 110 into the reactor via input gas flow conduit 120, typically at a gas velocity ranging from about 0.5 to about 20 fps. The hydrocarbon gas 110 is pushed at a first velocity (typically ranging from about 0.5 to about 20 fps) through a gas distributor assembly 204, comprising a cone 212 and gas distributor system 216, as shown by gas flow arrows 220 (which are typically substantially tangential to the rounded surface of the cone 212) to create a vortex 208 from the inflowing gas swirling at a lower second velocity (typically ranging from about 0.5 to about 20 fps) around the cone 212. The reactor cone 212 provides a conical gas impermeable structure for the gas vortex 208 to spin around.

The tapered continuous sidewall of the cone 212 provides for different cross-sectional areas of flow relative to the area between the cone sidewall and interior surface of the reactor 101. The varying cross-sectional areas of flow increasing progressively from the base of the cone to the cone apex can provide for different velocity zones and different slip velocities. In many applications, a lower velocity zone is proximal the base of the cone (and typically ranges from about 10 to about 15% of the height H of the cone 212), and an upper velocity zone is near an apex of the cone (and typically above about 40% of the cone height H), with an intermediate velocity zone being located therebetween (which typically ranges from about 15% to about 40% of the cone height H). The slip velocity in the lower velocity zone is typically less than the slip velocity in the intermediate velocity zone, and the slip velocity in the upper velocity zone is typically greater than the slip velocity in the intermediate and lower velocity zones. While a continuously tapered sidewall of the cone 212 is shown in the figures, it is to be appreciated that the sidewall can be discontinuously tapered or stepped to provide similar velocity zones.

Particulate catalyst 140 is placed into the reactor 101 prior to startup and/or during operation, and the vortex 208 created by the gas distributor 216 keeps the particulate catalyst 140 particles suspended in a reaction zone having a turbulent regime flow around the circumference of the cone 212. The hydrocarbon gas 110 reacts with the suspended particulate catalyst 140 particles in the vortex 208, and the particulate catalyst 140 particles start growing carbonaceous material, such as graphite nanofibers, which increases the weight of the catalyst particles. The curtain gas 158 is fed into the reactor 101, via a top-down curtain gas flow conduit 224 positioned within gas flow conduit 112, and a gas curtain generator 226, in an opposing direction of flow to the hydrocarbon gas 110 to form a gas curtain 228 of a third gas flow velocity less than the first and second gas flow velocities. The downward flow of curtain gas 158 effectively forms a curtain of low gas velocity (typically ranging from about 1:3 to about 1:6 ratio of curtain:feed flow rate) to prevent the particulate catalyst particles 140 from rising above the turbulent flow or reaction zone formed by the vortex 208. A gaseous mixture 210 of the unreacted hydrocarbon gas and gaseous byproducts (e.g., hydrogen gas) and curtain gas exits as a particle-free gas from the vortex 208 via recycle flow conduit 112.

Reactor discharge bin 232 is fluidly connected to the reactor 101. Intermittently, when a sufficient amount of carbonaceous material has been broken off from the turbulence on the particulate catalyst 140 within the gas vortex 208, an input shaft 236 assists the slide of the gas distributor assembly 204 by following discharge guide 240 and the combination of these functions will tilt the gas distributor assembly 204 dropping carbonaceous material into the bin 232, which is hermetically sealed to prevent oxygen from coming into contact with the carbonaceous material.

The carbonaceous material is discharged from the discharge bin 232 using a jacketed cooling auger 244 driven by motor 248. The second intermediate carbonaceous product 136 is discharged to product storage tank 252 via an airlock 256 and jacketed cooling auger 260 driven by motor 264.

Figure 5:
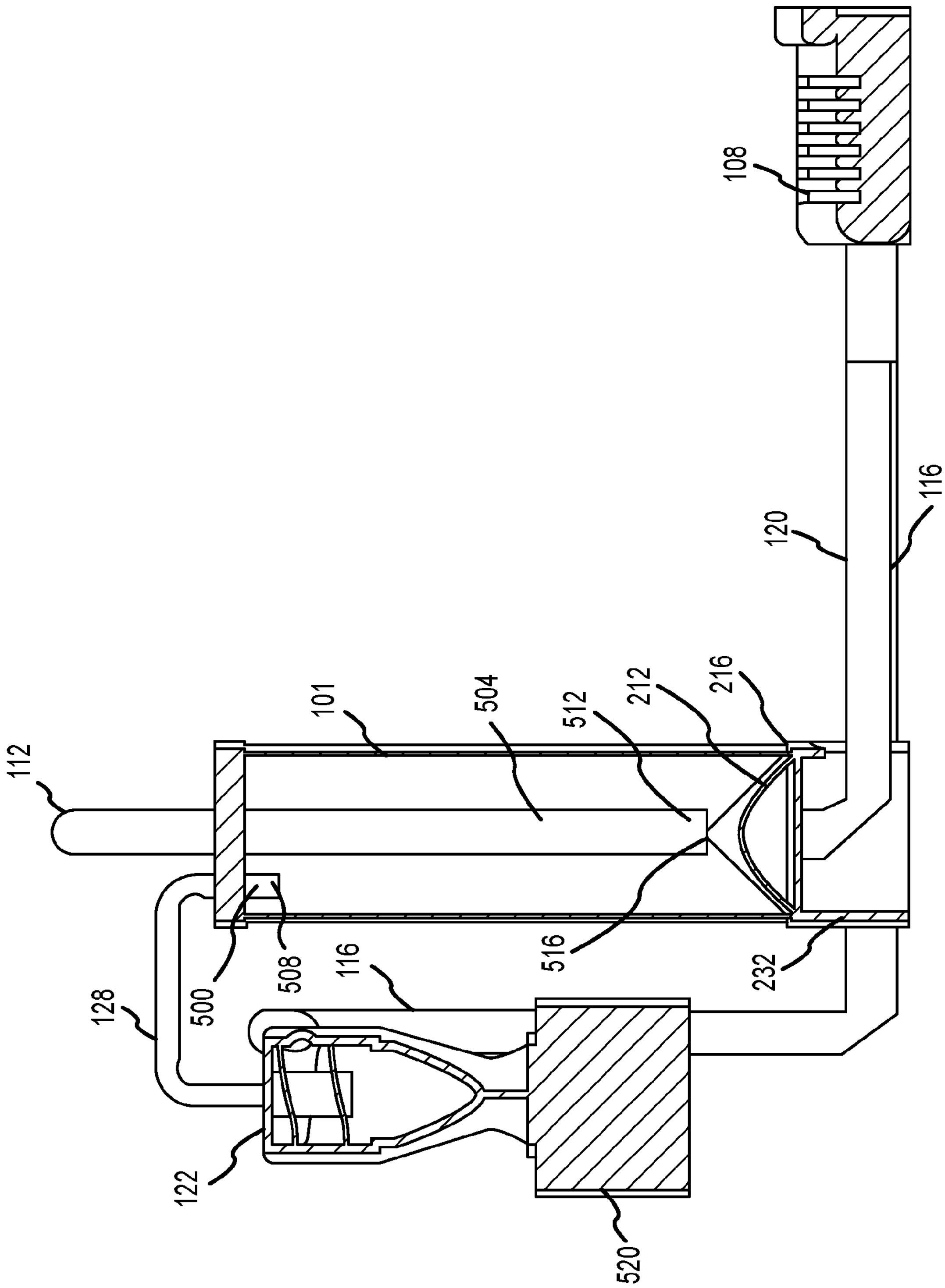
FIG. 5 is a front cross-sectional view of the reactor system of FIG. 2B.
Figure 6A:
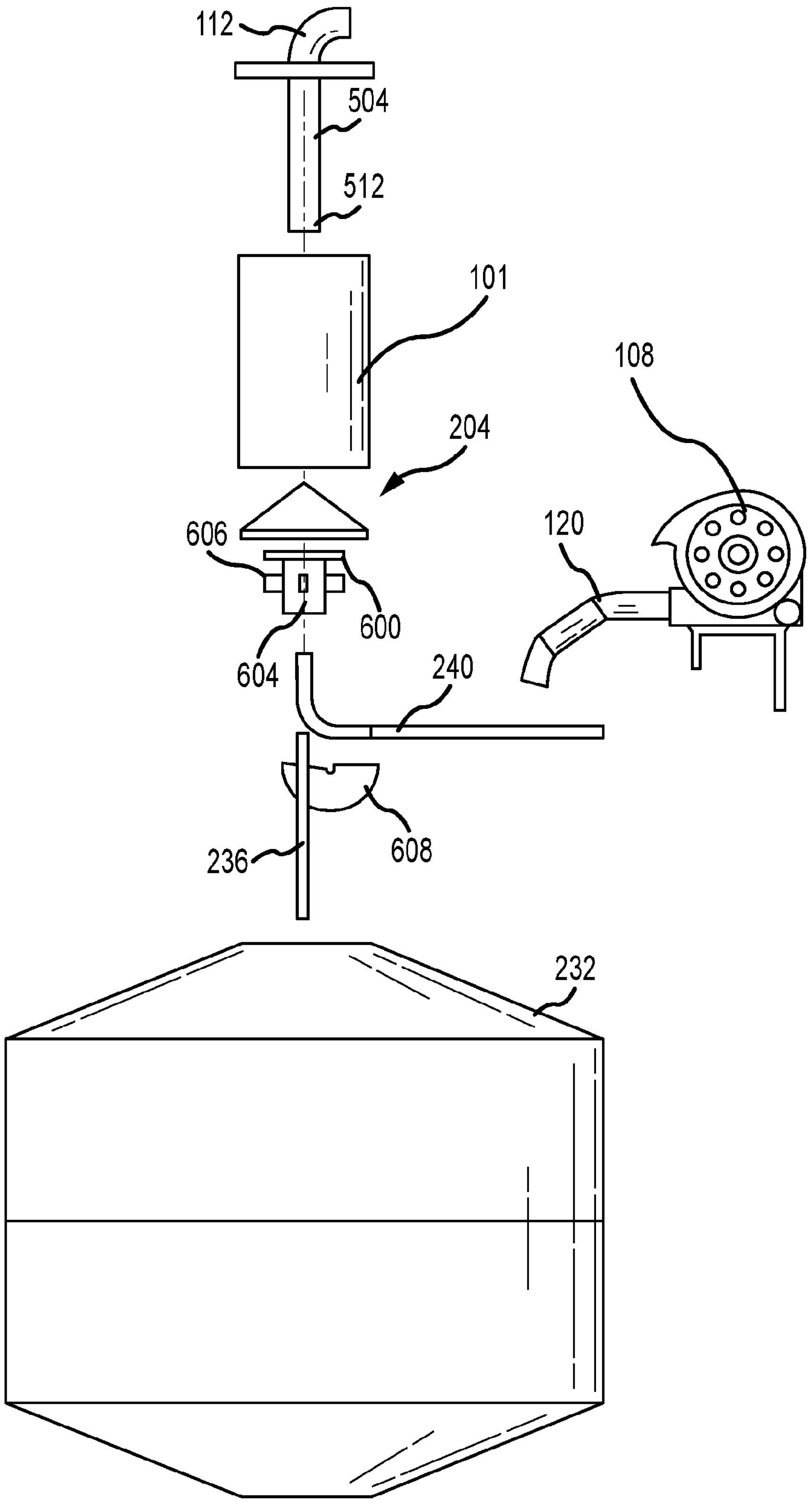
FIG. 6A is a disassembled view of a portion of the reactor system of FIG. 2B
Figure 6B:
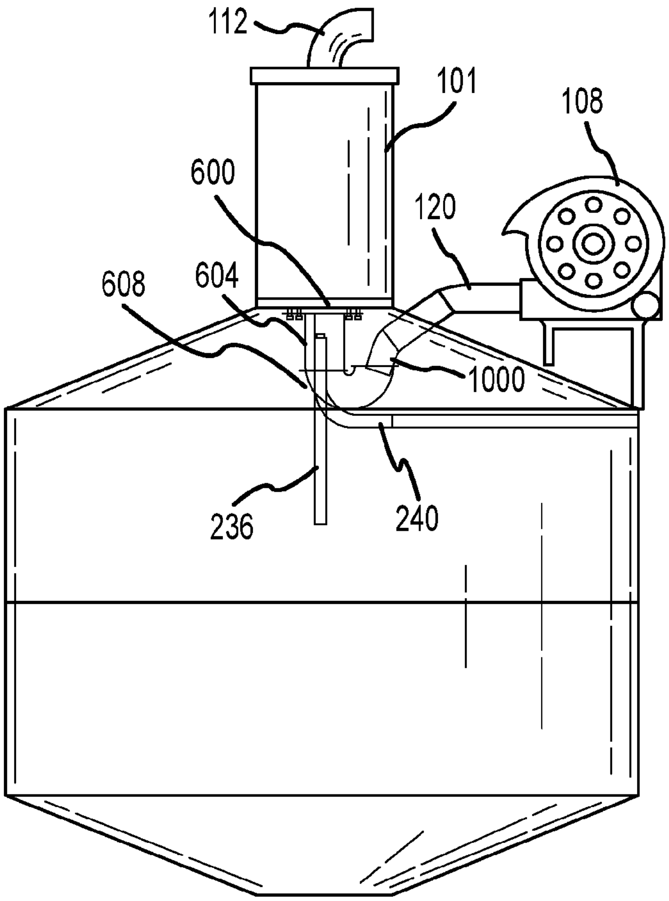
FIG. 6B is an assembled view of the portion of the reactor system shown in FIG. 6A.
Figure 7:
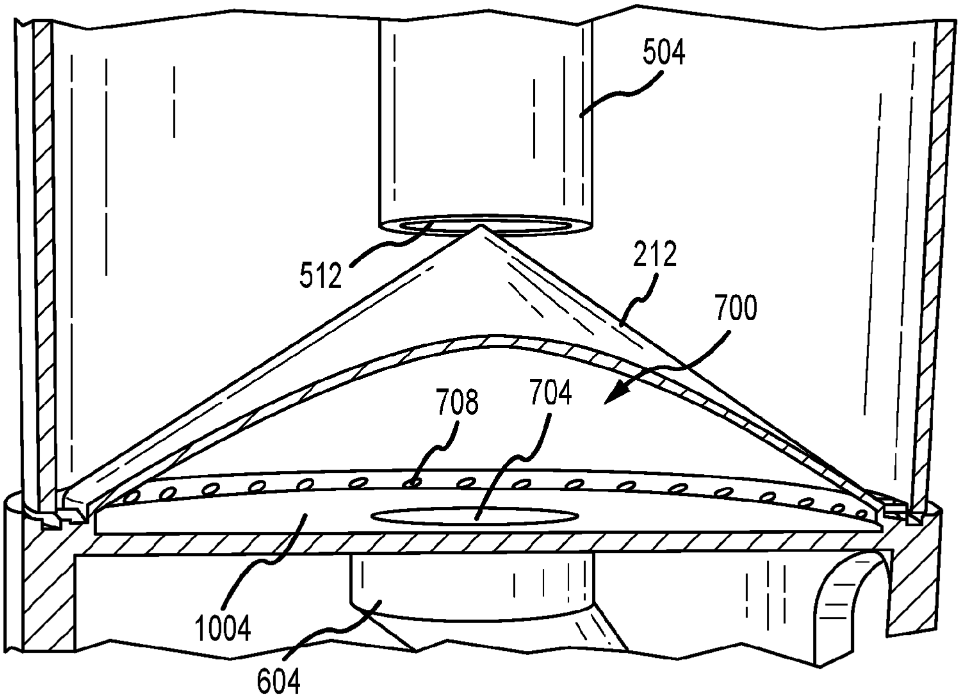
FIG. 7 is a cross-sectional view of a portion of the reactor system of FIG. 2B.
Figure 8:
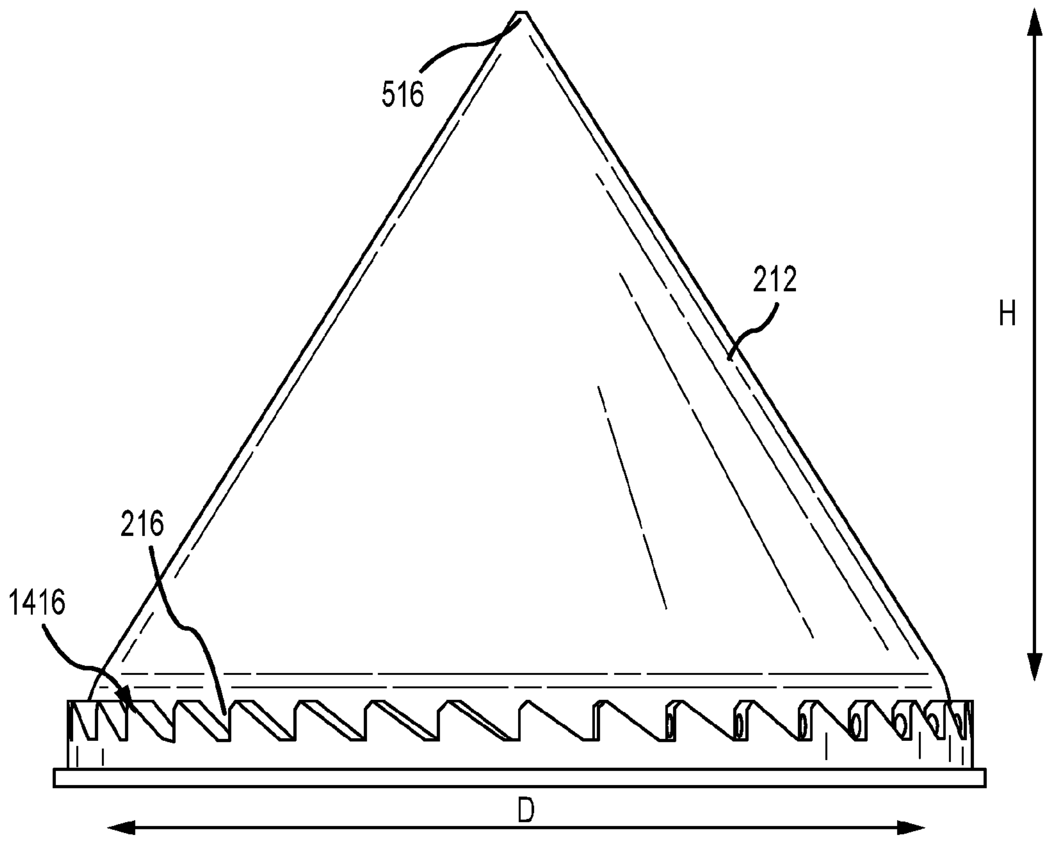
FIG. 8 is a side view of a gas distribution apparatus of the reactor system of FIG. 2B.
Figure 9:
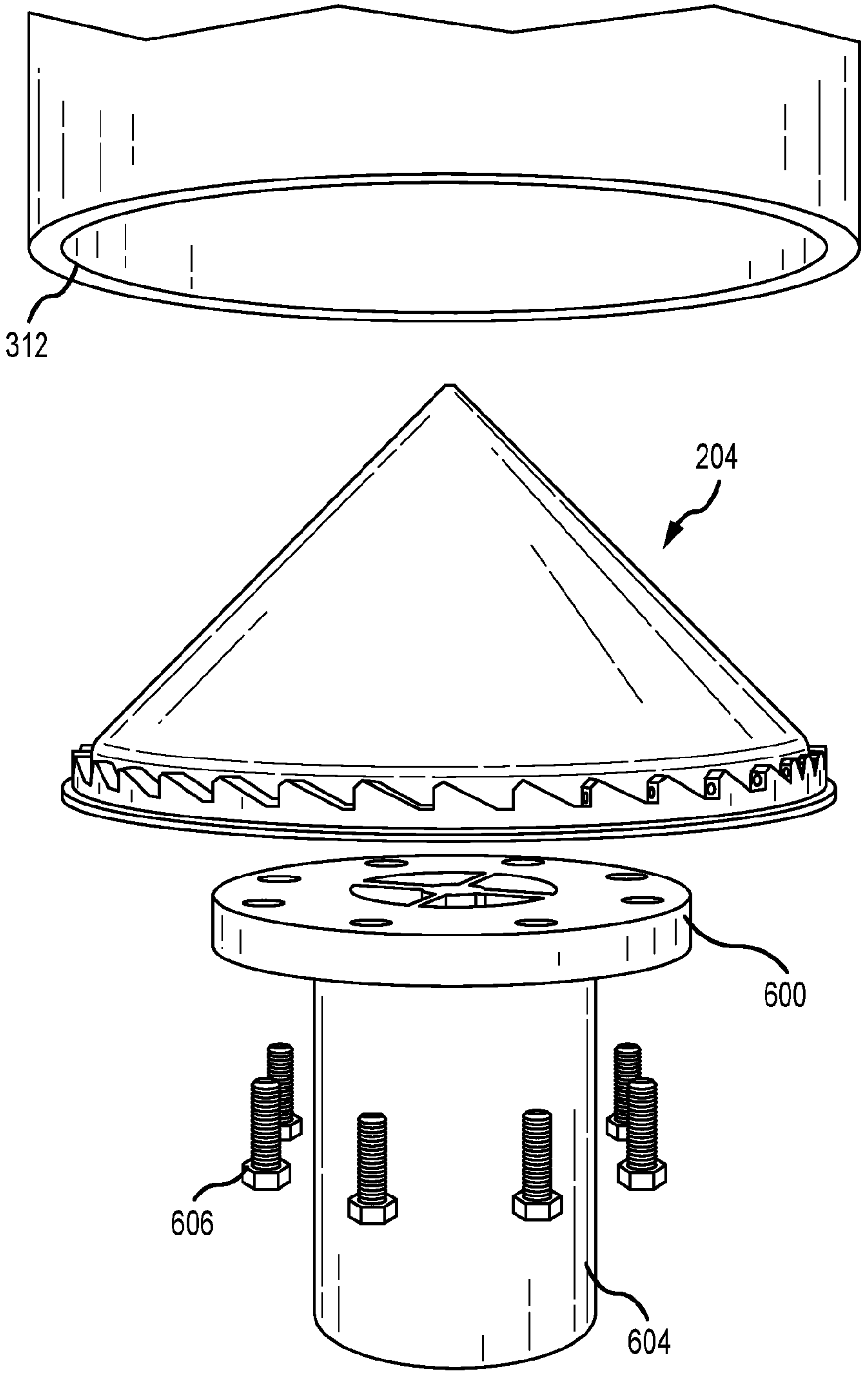
FIG. 9 is a disassembled view of the portion of the reactor system shown in FIG. 7.
Figure 10:
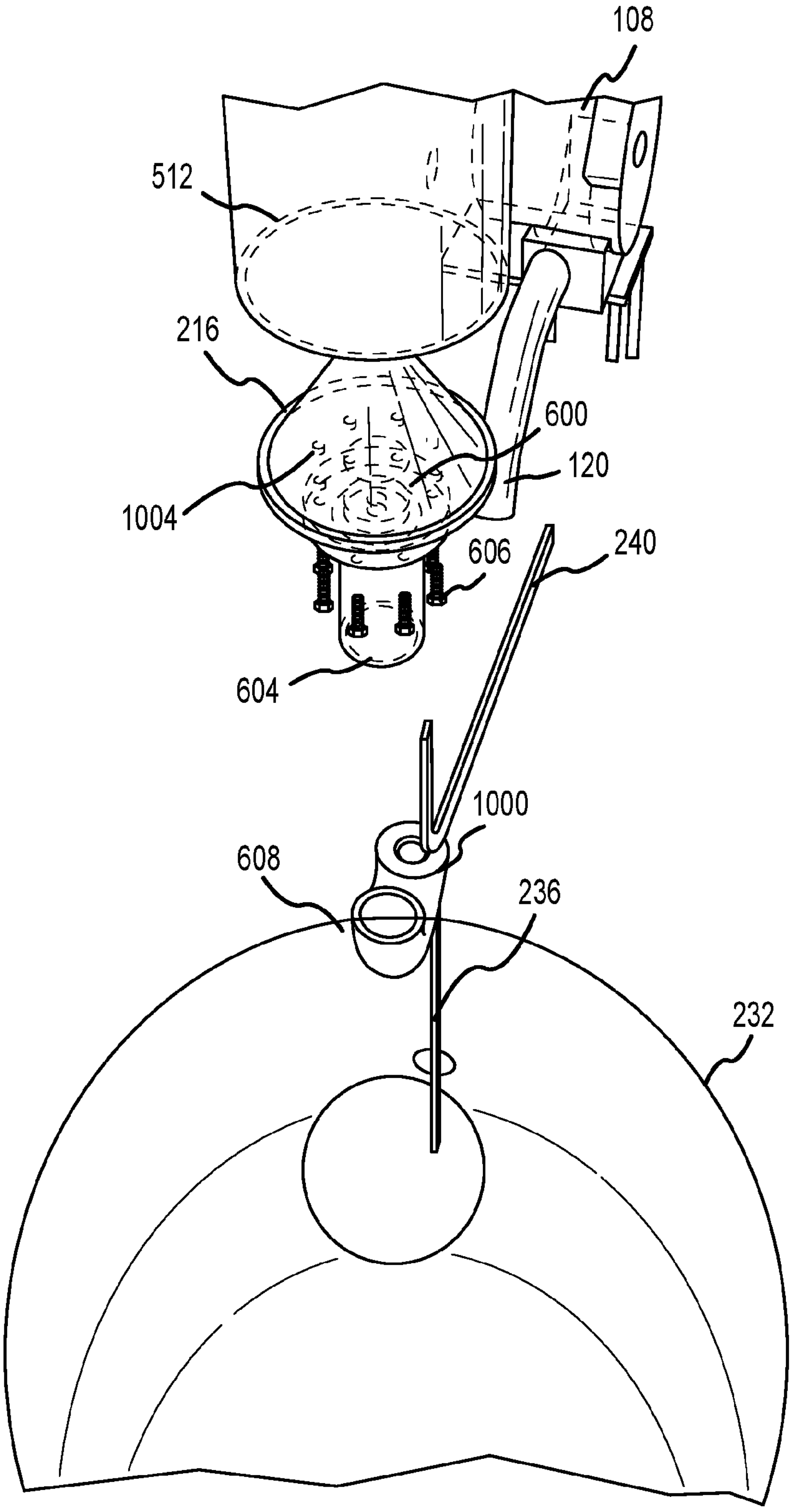
FIG. 10 is a perspective disassembled view of the portion of the reactor system shown in FIG. 7.
Figure 11:
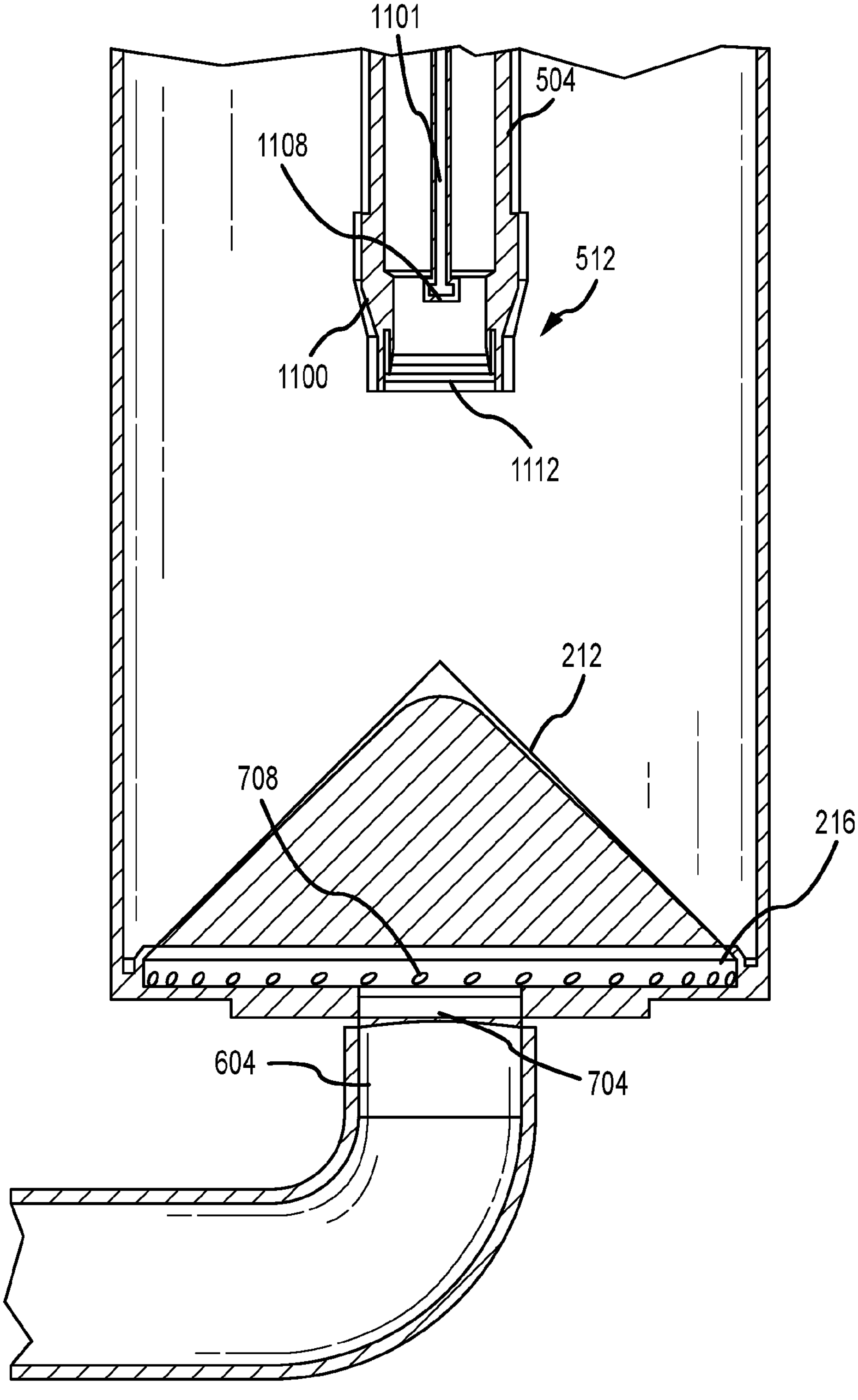
FIG. 11 is a cross-sectional view of a portion of the reactor system of FIG. 2B.
Figure 12:
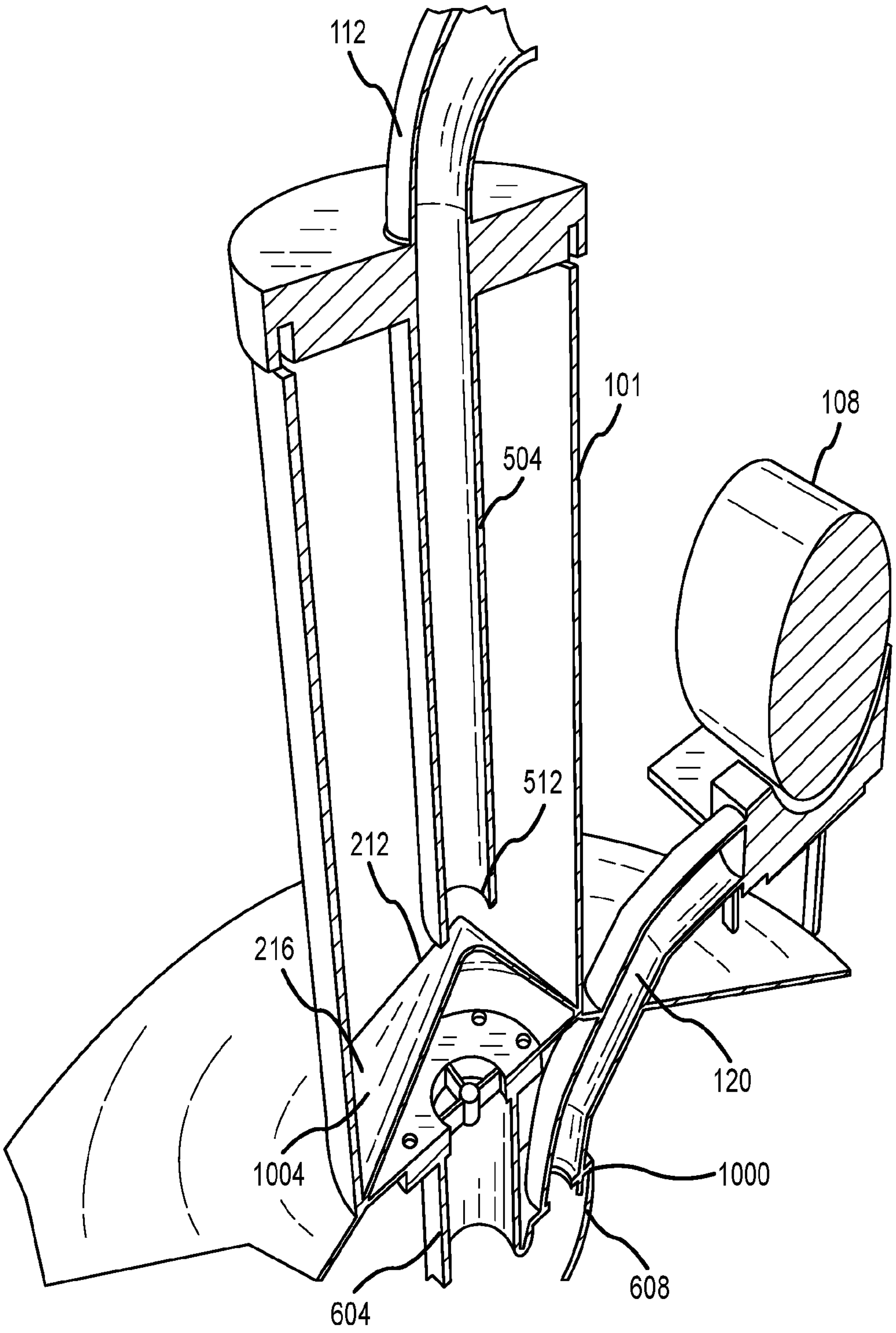
FIG. 12 is a perspective cross-sectional view of a portion of the reactor system of FIG. 2B.
Figure 13:
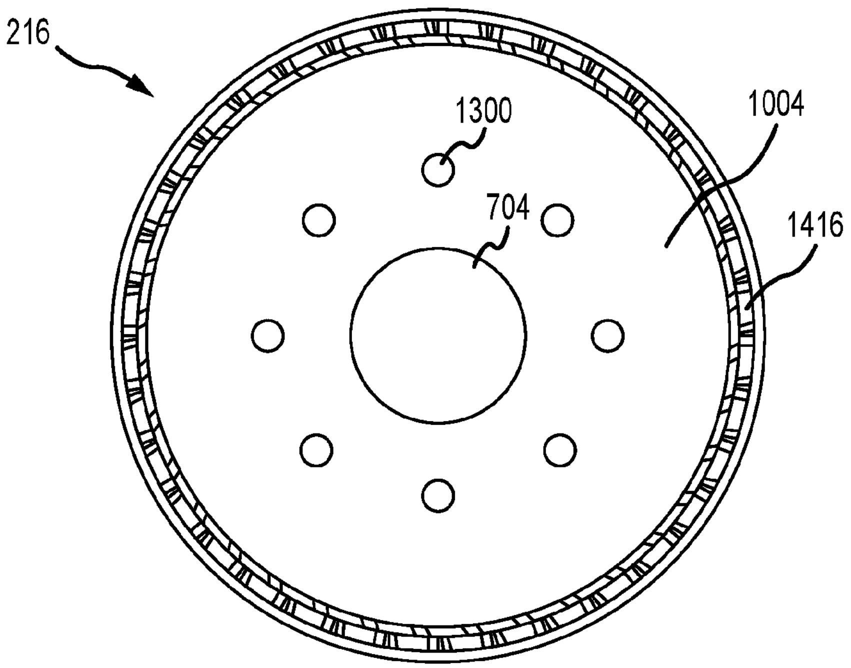
FIG. 13 is a plan view of the gas distribution apparatus of the reactor system of FIG. 2B.
Figure 14:
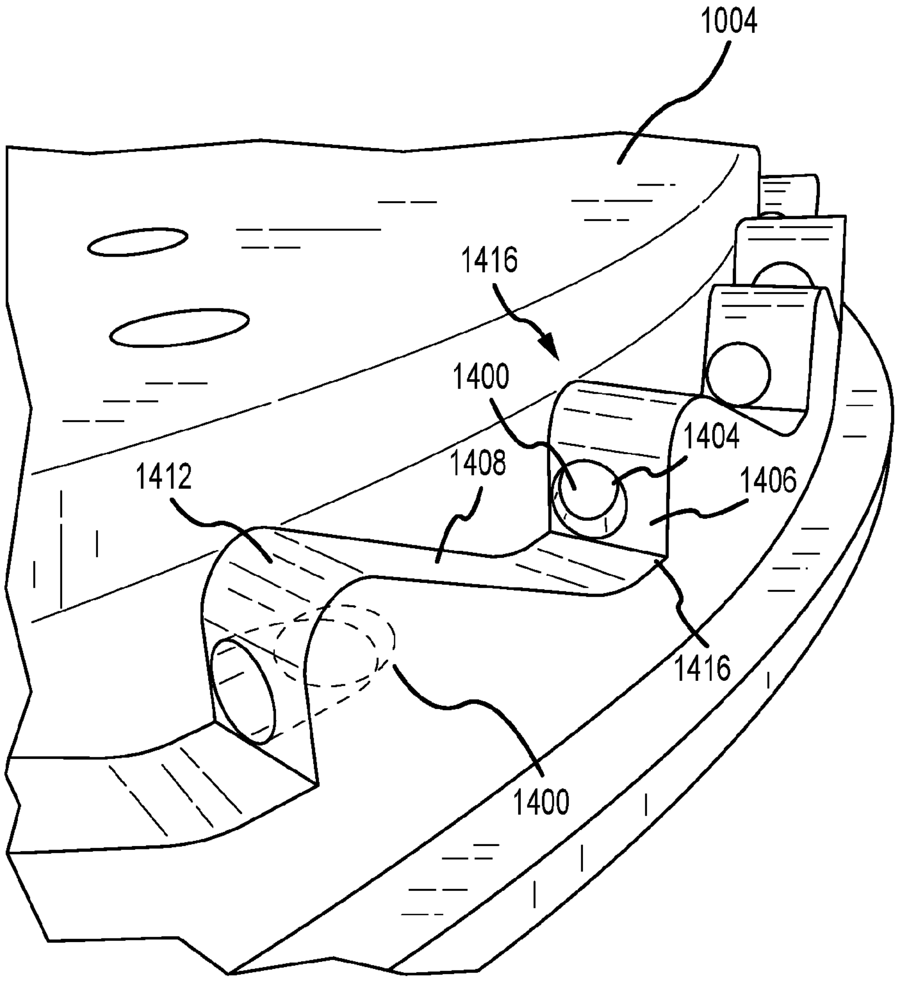
FIG. 14 is an exploded view of a portion of the gas distribution apparatus of the reactor system of FIG. 2B.
Figure 15:
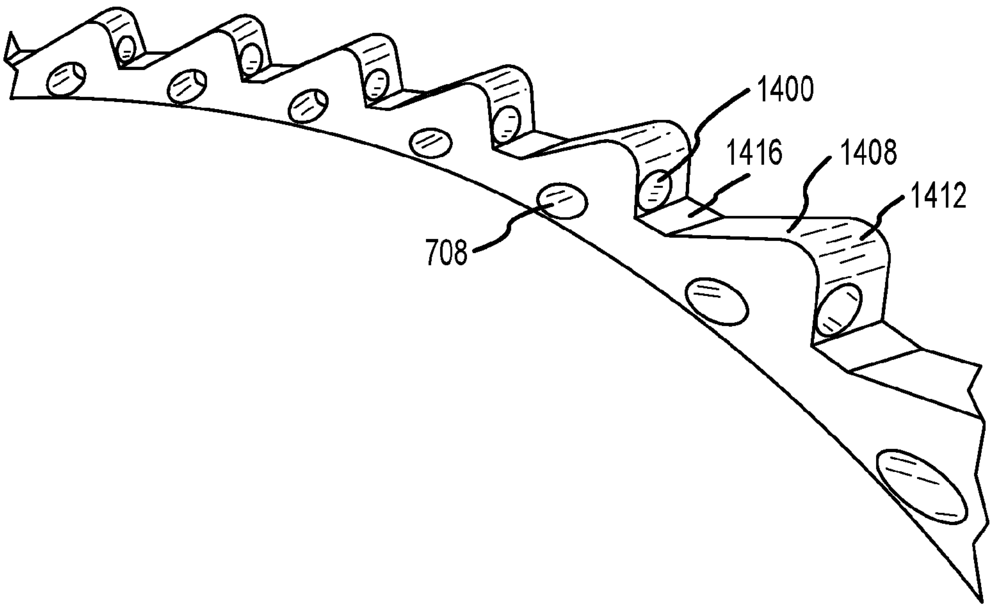
FIG. 15 is an exploded view of a portion of the gas distribution apparatus of the reactor system of FIG. 2B.
Figure 16:
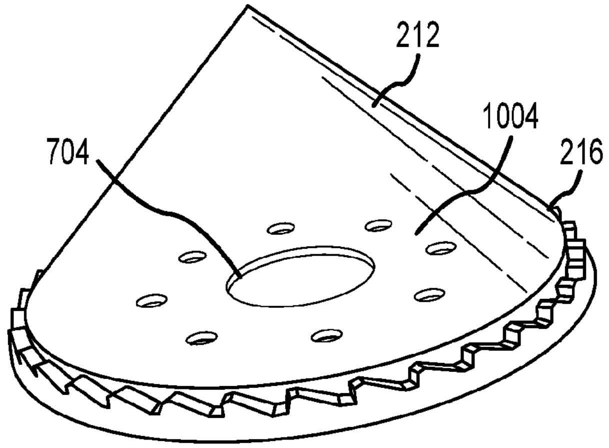
FIG. 16 is a bottom view of the gas distribution apparatus and reactor cone of the reactor system of FIG. 2B.
Figure 17:
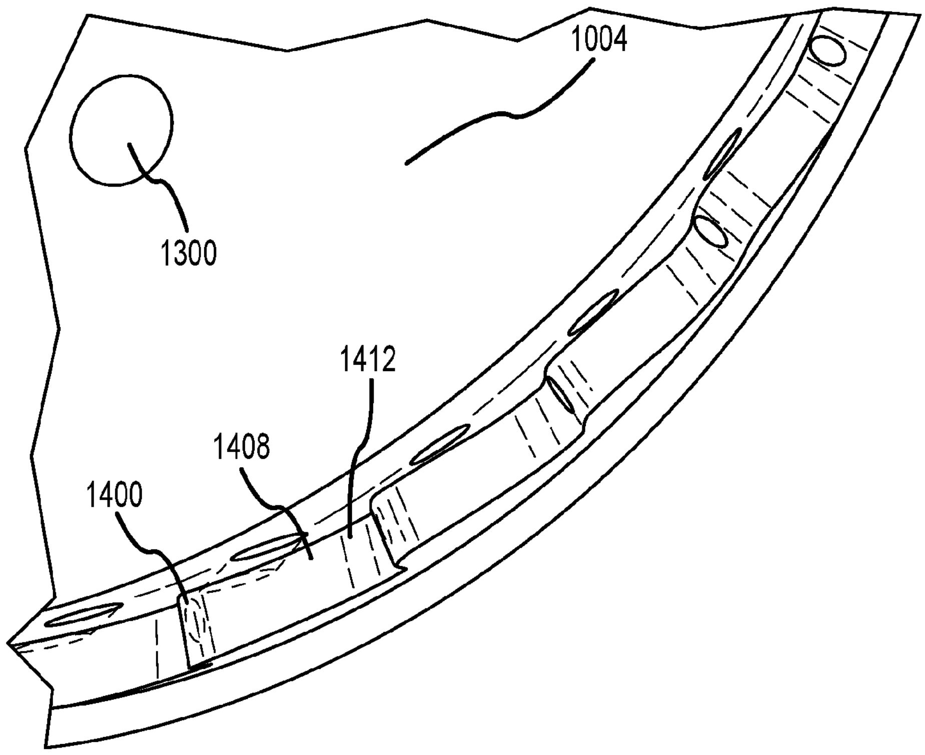
FIG. 17 is a plan view of a portion of the gas distribution system of FIG. 2B.
Figure 18:
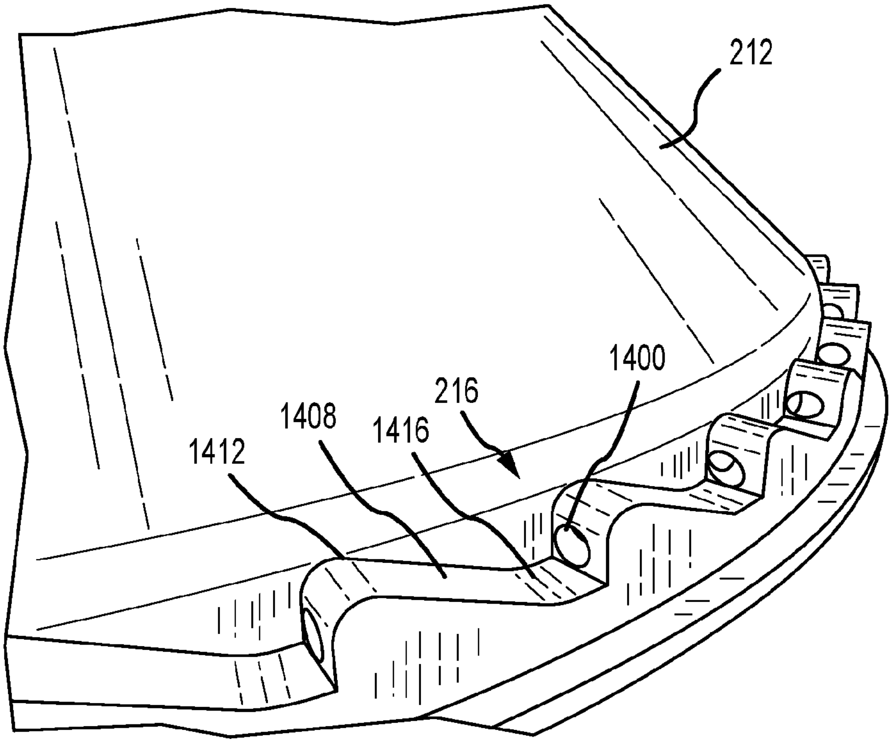
FIG. 18 is a side view of a portion of the gas distribution apparatus and reactor cone of the reactor system of FIG. 2B.
Figure 19:
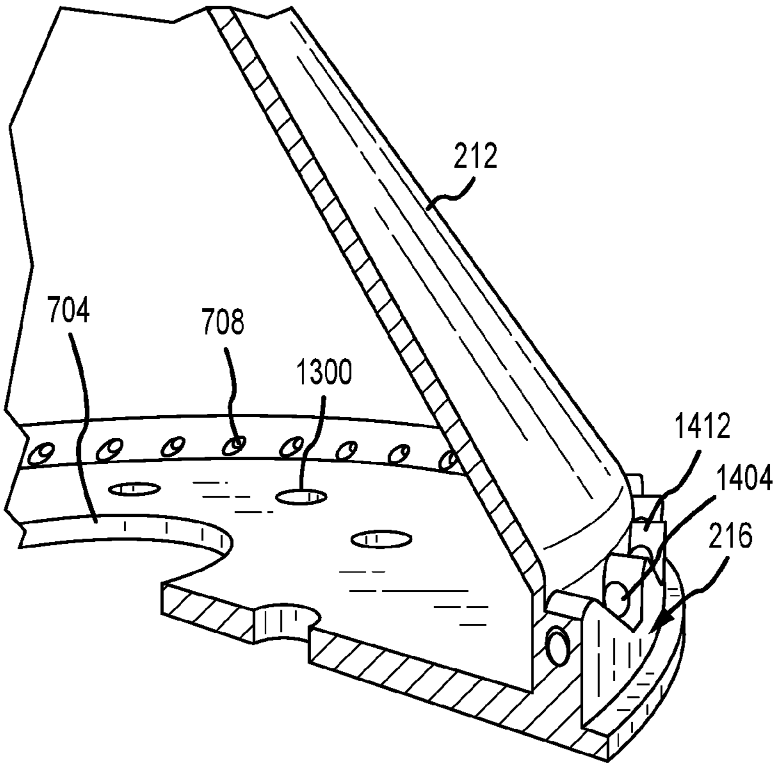
FIG. 19 is a partial side cross-sectional view of the portion of the gas distribution apparatus and reactor cone of FIG. 18.
Figure 20:
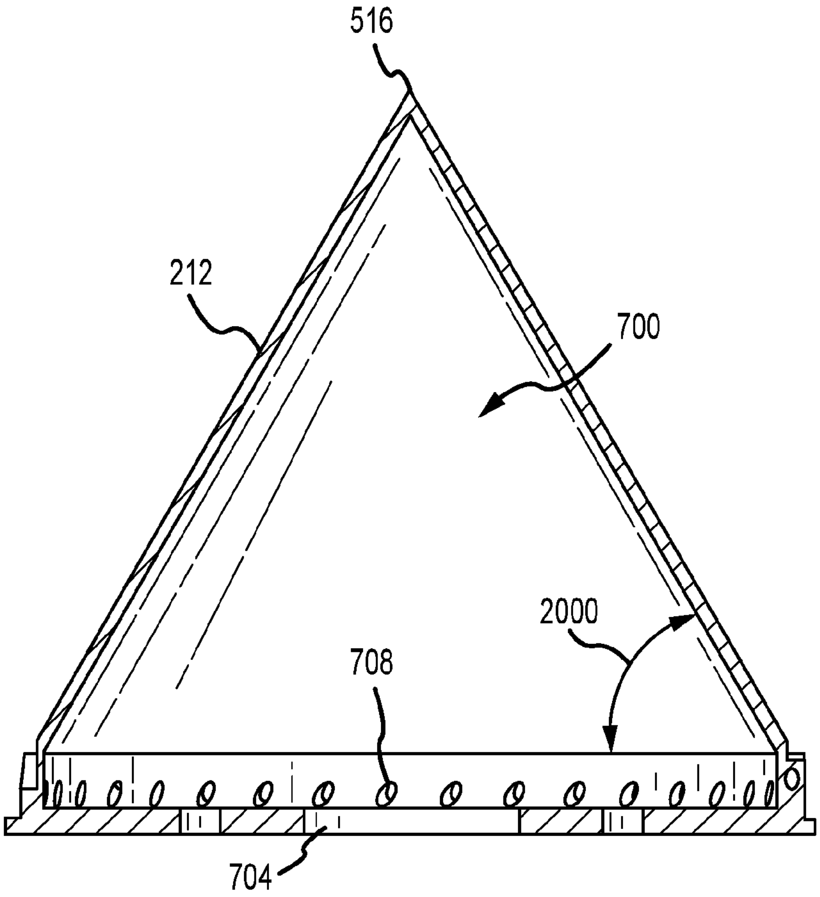
FIG. 20 is a side cross-sectional view of the portion of the gas distribution apparatus and reactor cone of FIG. 18.
Figure 21:
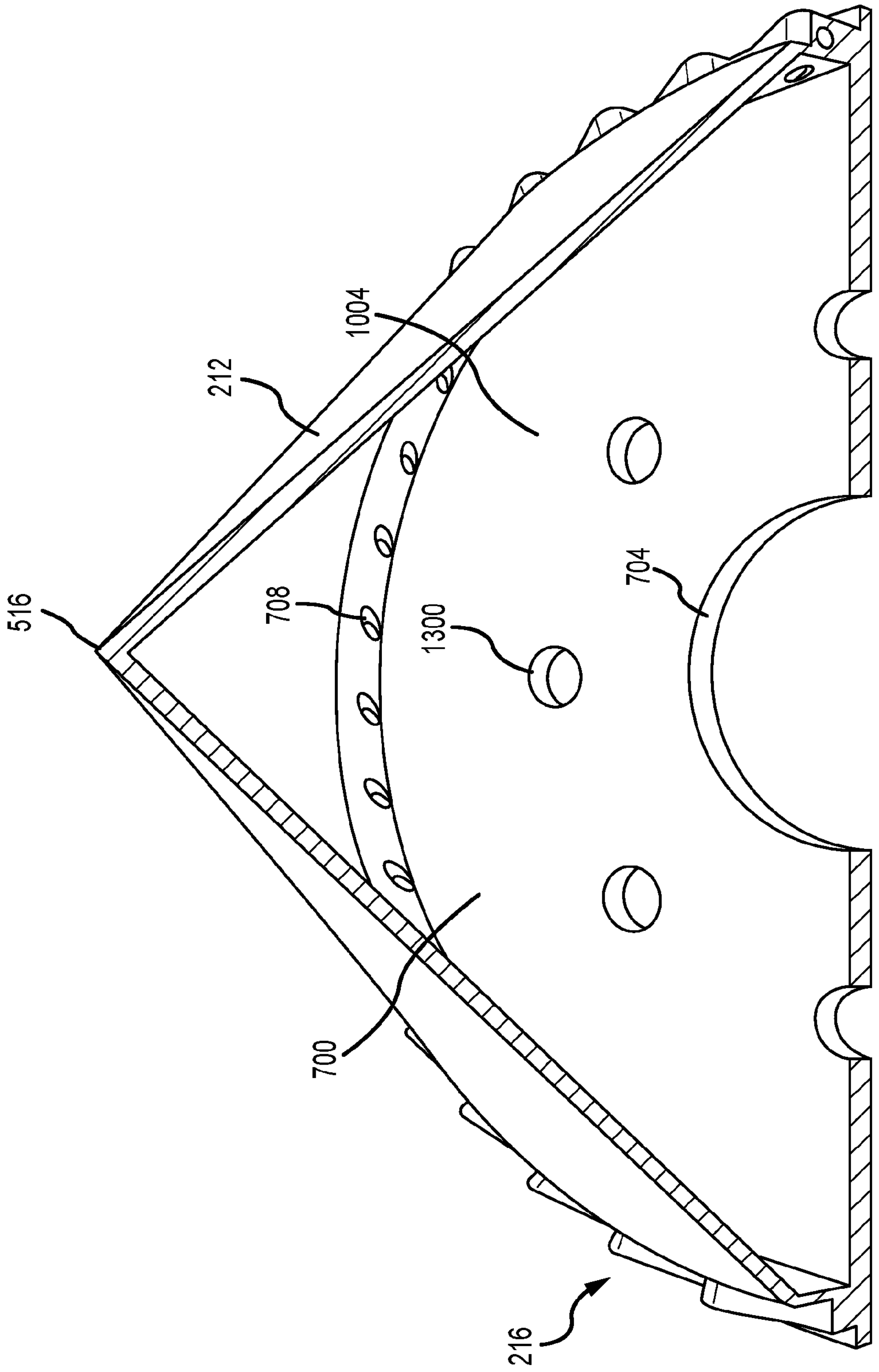
FIG. 21 is another side cross-sectional view of the portion of the gas distribution apparatus and reactor cone of FIG. 18.

Referring to FIGS. 2B and 3-5, a particular implementation of the reactor system 200 is depicted. The cylindrical reactor 101, particle separator 122, and compressor or blower 108 are shown in fluid communication with each other via the recycle flow conduits 112 and 116, input gas flow conduit 120, and recycle flow conduit 128. Referring to FIG. 5, the recycle flow conduit 128 and the recycle flow conduit 112 each extends into the interior of the reactor as shown by first and second recycle conduit segments 500 and 504, respectively. A first inlet 508 of the first recycle conduit segment 500 extends into the reactor interior a shorter distance than a second inlet 512 of the second recycle conduit segment 504; that is, the first inlet 508 is positioned above the second inlet 512 to prevent particulate catalyst particles 140 from premature removal from reaction zone. The second inlet 512 is positioned in spatial proximity to an apex 516 of the cone 212 and, in some implementations, is positioned within the second inlet 512 and second recycle conduit segment. The cone 212, recycle flow conduit 112, and second inlet 512 are centered about a longitudinal axis 272 of the reactor 101.

The embodiment of FIGS. 2B and 3-5 comprises a second reactor discharge bin 520 positioned beneath the particle separator 122 to receive the first intermediate carbonaceous product 125. The use of dual reactor discharge bins 232 and 520 enables lighter composite particles, comprising the particulate catalyst 140 and lighter amounts of carbonaceous material (e.g., shorter carbon nanofiber lengths), to be removed by using gas flow velocities (higher than the second gas flow velocity) to blow the composite particles into the first inlet 508 for collection as the first intermediate carbonaceous product 125 in the second reactor discharge bin 520 and heavier composite particles, comprising the particulate catalyst 140 and heavier amounts of carbonaceous material (e.g., longer carbon nanofiber lengths), to be removed by spatial movement of the gas distributor assembly 204.

Referring to FIGS. 6A, 6B, 9-10, 12, and 27-28, the discharge of the second intermediate carbonaceous product 125 into the reactor discharge bin 232 will be described. As can be seen from the figures, the gas distributor assembly 204 is fastened via plural fasteners 606 to the base of the reactor 101 and interior 1004 of the gas distribution system 216 via a flange assembly comprising a flange 600 and interconnected conduit segment 604. The inlet of the conduit segment 604 is connected to an outlet of an elbow 608 and the inlet of the elbow 608 movably engages the outlet of the input gas flow conduit 120. To maintain a hermetic seal between the elbow 608 and the input gas flow conduit 120, the inlet of the elbow 608 comprises a gasket assembly 1000.

To discharge of the second intermediate carbonaceous product 125 into the reactor discharge bin 232, the reactor assembly 100 operates in first and second modes.

Figure 28:
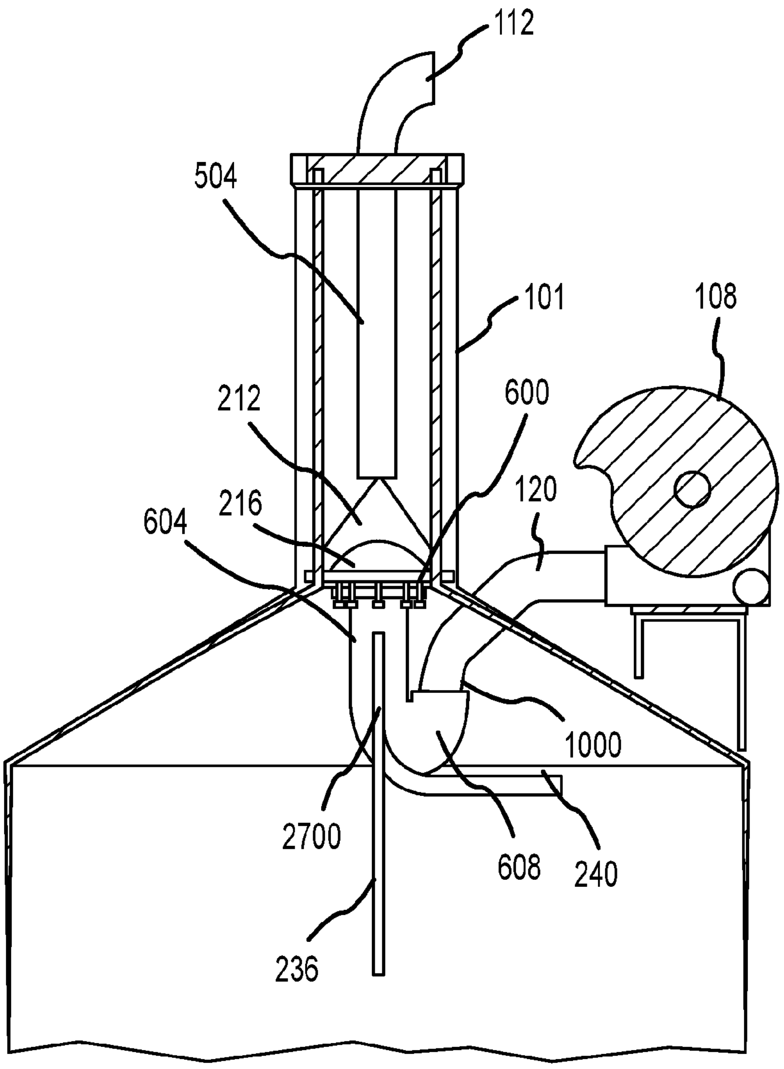
FIG. 28 depicts a second spatial position of the reactor cone apparatus of the reactor system of FIG. 2B that enables catalytic production of product.

In a first mode shown in FIG. 28, the gas distributor assembly 204 comprising the cone 212 and gas distributor 216 is in engaged by a hermetic seal with the reactor 101 and the gasket assembly 1000 on the inlet of the elbow 608 engages and forms a hermetic seal with an outlet of the input gas flow conduit 120. The gas distributor assembly 204 and conduit segment 604 are in a first spatial position relative to a length of the discharge guide 240. In this configuration, the reactor 101 is fluidized with the hydrocarbon gas 110 to cause graphite or carbon nanofibers to form on the particulate catalyst 140.

Figure 27:
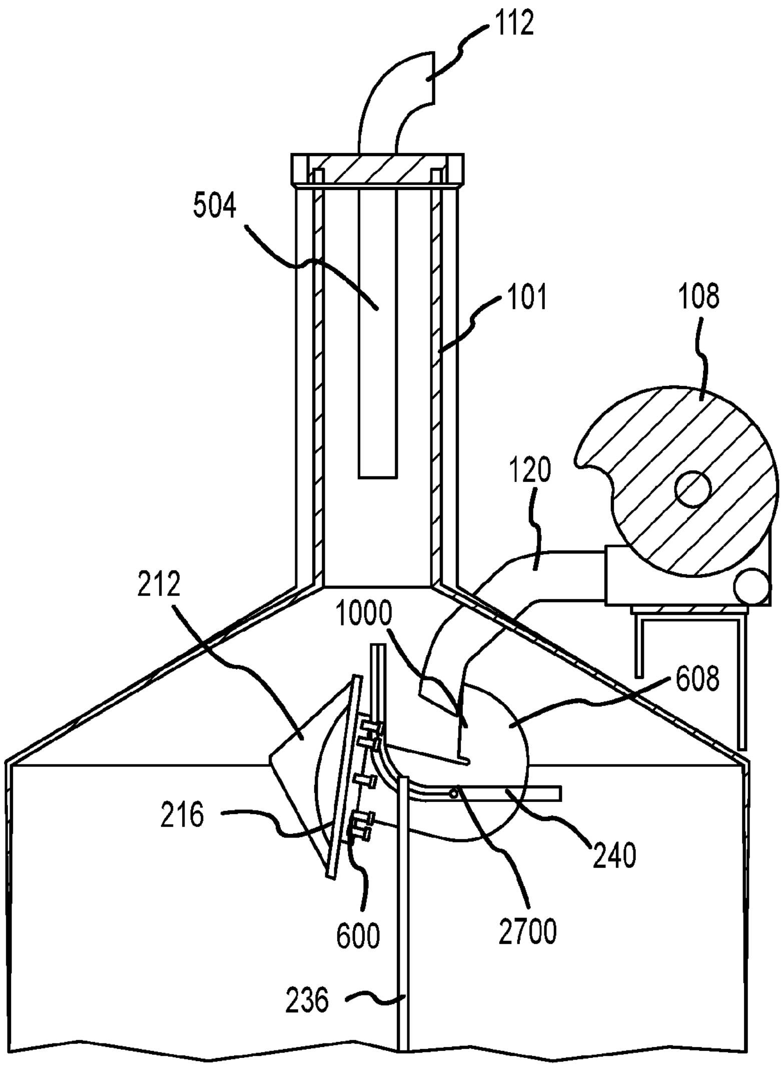
FIG. 27 depicts a first spatial position of the reactor cone apparatus of the reactor system of FIG. 2B that enables product and catalyst removal.

In a second mode shown in FIG. 27, the gas distributor assembly is disengaged from (and no longer forms a hermetic seal with) the reactor 101 and the gasket assembly 1000 on the inlet of the elbow 608 is disengaged (and no longer forms a hermetic seal with) the outlet of the input gas flow conduit 120. The gas distributor assembly 204 and conduit segment 604 are in a second spatial position (different from the first spatial position) relative to the length of the discharge guide 240. In this configuration, the reactor 101 is not fluidized with the hydrocarbon gas 110 and the composite particles in the reactor 101 can be discharged into the reactor discharge bin 232.

Any displacement mechanism can be used to selectively place the reactor assembly in either the first or second mode. For example, the input shaft 236 can engage a cam that is rotated to cause the input shaft to move up and down. In another example, the input shaft is pneumatically or hydraulically displaced.

While the discharge guide 240 is shown as a guide rail movably engaging a guide member 2700 (e.g., protruding pin or wheel), any guide or linkage mechanism can be used, such as a linear slide mechanism comprising ball bearings moving along a shaft.

With reference to FIGS. 7-8, and 13-21, the gas distributor assembly 204 will be described. The gas distributor assembly 204 comprises plural gas injectors 1416 positioned at substantially uniformly spaced locations around a circumference of the interior 1004 of the gas distributor assembly 204. Holes 1300 positioned at substantially uniformly spaced locations around the inlet 704 align with holes in the flange 600 and are configured to receive fasteners 606.

The interior volume 700 of the cone 212 is at least substantially hollow and the cone sidewalls impermeable to gas flow to act as a manifold for hydrocarbon gas entering via the inlet 704 such that the hollow interior substantially equalizes the inflowing hydrocarbon gas pressure before the gas passes through plural inlet orifices 708, flows through respective internal passageways 1400 and outward through respective output orifices 1404 in a substantially vertical surface 1406 into the reactor interior volume. To provide smoother gas flow and reduced gas pressure loss, the passageways 1400 are typically curved (e.g., arcuate or in some cases radiused) and not sharply angled. The outflowing gas is directed by ramp 1408 along a path of flow substantially parallel to the ramp slope (which typically ranges from about 1 to about 75 degrees and more typically from about 1 to about 45 degrees relative to a horizontal plane) and into the reactor interior. The rounded edge 1412 of each of the plural gas injectors 1416 provides a smooth gas exit into the reactor interior.

Typically, the inlet and output orifices 708 and 1404 and each intervening passageway 1400 for each gas injector 1416 and for all gas injectors 1416 are substantially the same diameter. The diameter is selected to provide an output gas velocity that is at least the terminal velocity for the particulate catalyst particles to maintain entrainment of the particles and inhibit particle collection in the substantially flat surface 1416 at the output orifice 1404 and gas injector clogging. Typically, the output gas velocity ranges from about 0.5 to about 20 fps.

The cone angle θ 2000 (FIG. 20) formed between the cone sidewall and a horizontal plane determines the speed of the gas flow in the reaction zone and the size of the carbonaceous material (e.g., graphite nanofibers) produced. For example, to produce longer graphite nanofibers the angle θ is decreased to produce a lower gas velocity in the reaction zone, and to produce shorter graphite nanofibers the angle θ is increased to produce a higher gas velocity in the reaction zone. Stated differently, the angle θ for longer graphite nanofibers is less than the angle θ for shorter graphite nanofibers. Typically, the angle θ 2000 ranges from about 1 to about 45 degrees and a ratio of the cone height (H) versus the cone diameter (D) (FIG. 8) ranges from about 1:1 to about 6:1.

Figure 22:
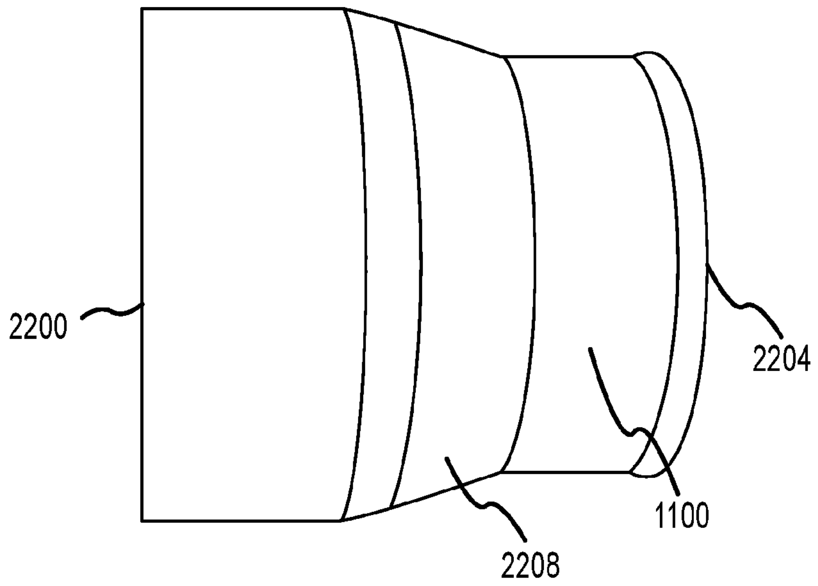
FIG. 22 is a side view of a gas curtain generator of the reactor system of FIG. 2B.
Figure 23:
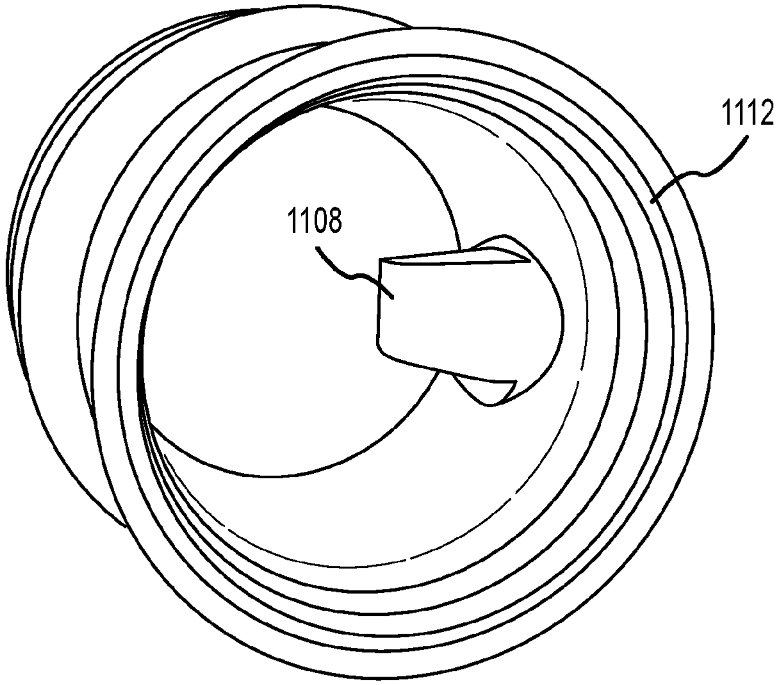
FIG. 23 is a bottom view of the gas curtain generator of FIG. 22.
Figure 24:
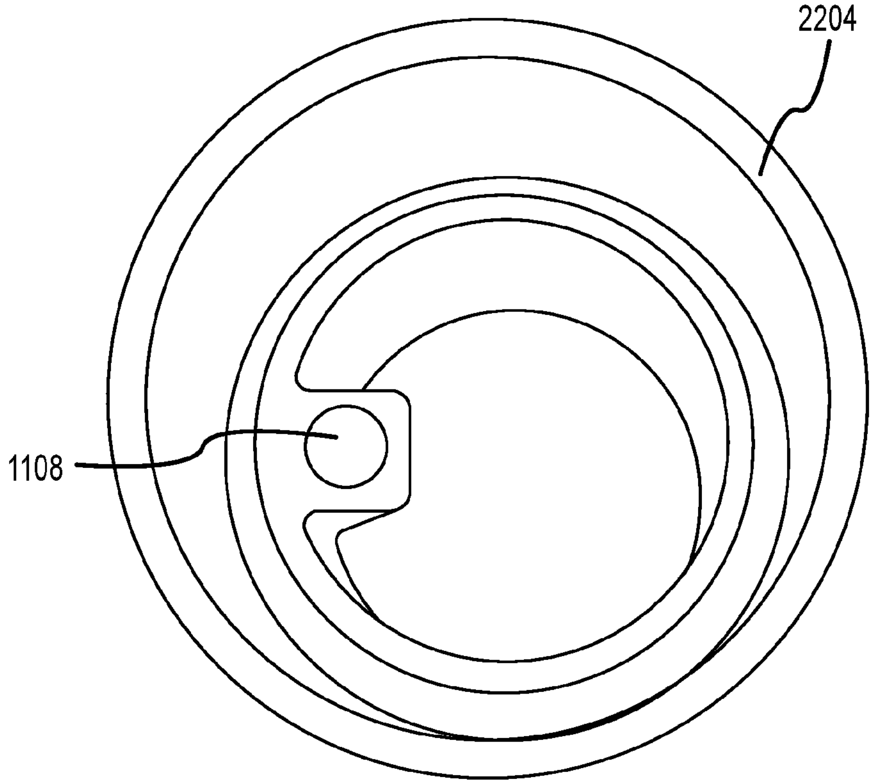
FIG. 24 is a top view of the gas curtain generator of FIG. 22.
Figure 25:
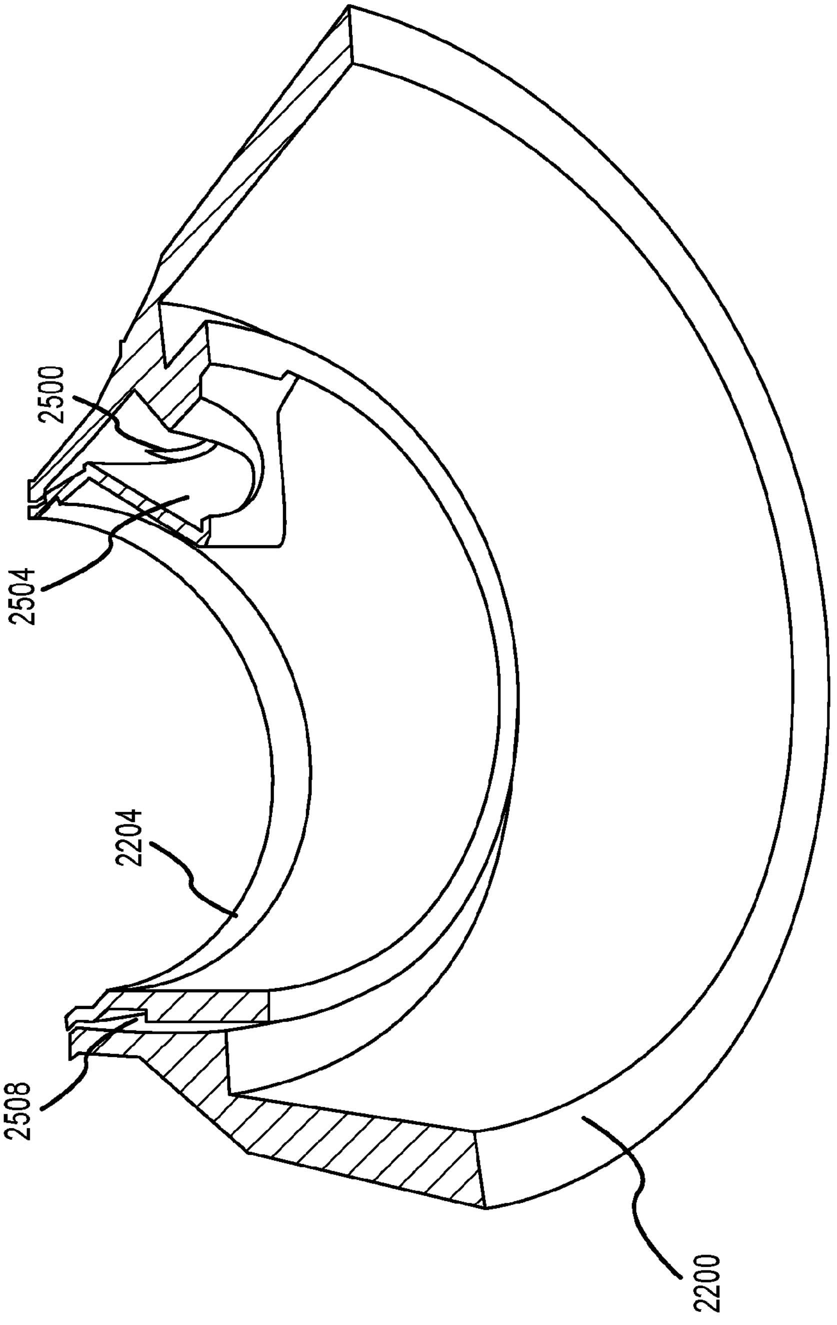
FIG. 25 is a top cross-sectional view of the gas curtain generator of FIG. 22.
Figure 26:
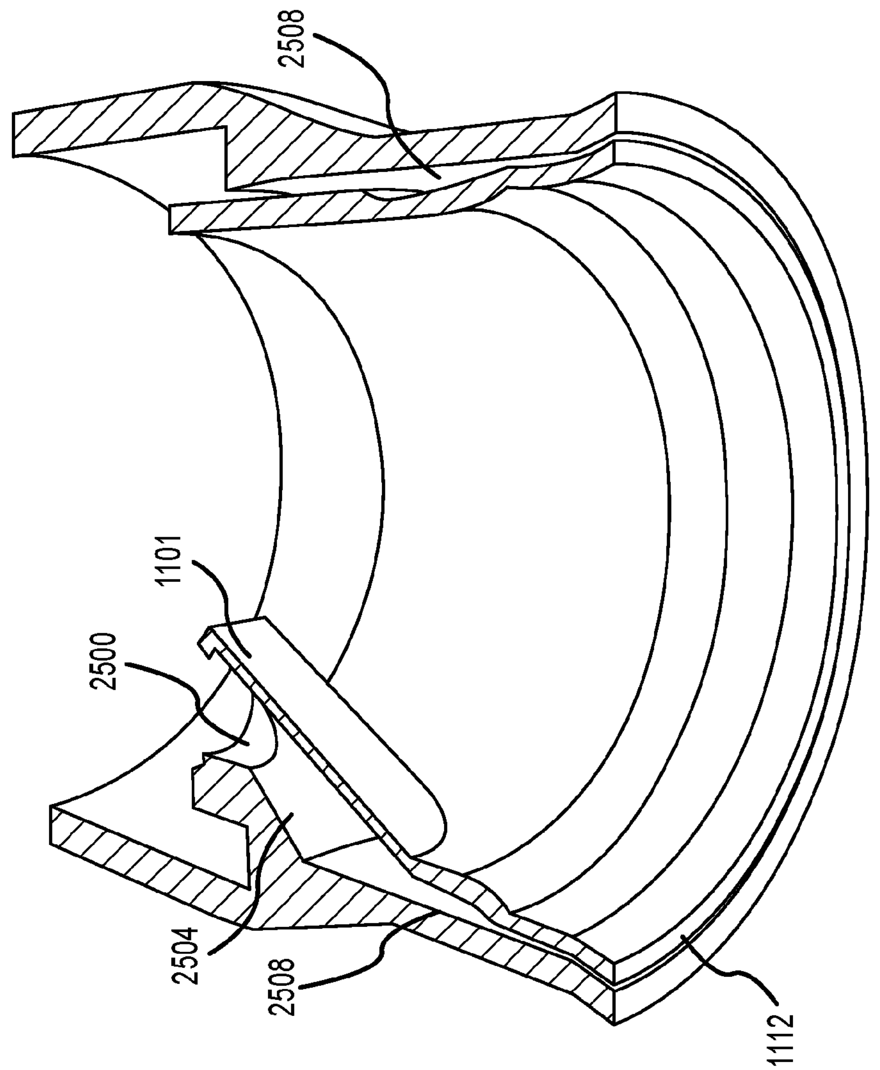
FIG. 26 is a bottom cross-sectional view of the gas curtain generator of FIG. 22.

Referring to FIGS. 11 and 22-26, the gas curtain generator 1100 that emits the curtain gas curtain will be described. The gas curtain generator 1100 is in fluid communication with a curtain gas supply conduit 1104 that connects to and forms a hermetic seal with a fitting 1108 of the generator 1100. The curtain gas flows through an inlet 2500, through a passageway 2504 and into an annular space 2508 for emission through an annular ring 1112 to form the gas curtain. As shown in FIG. 22, the diameter of the generator 1100 steps down from a first larger diameter inlet 2200 that engages the conduit segment 504 to a second diameter outlet 2204 having a smaller diameter. The step down is done using an intermediate section 2208 that progressively reduces diameter form the first diameter to the second diameter.

EXPERIMENTAL

The following examples are provided to illustrate certain aspects, embodiments, and configurations of the disclosure and are not to be construed as limitations on the disclosure, as set forth in the appended claims. All parts and percentages are by weight unless otherwise specified.

Example 1

A particulate catalyst was placed in a 5" quartz tube, which was heated by a Thermacraft wrap-around electrical heater. Methane was flowed into one end of the quartz tube at a rate of 1, 2, or 3 cubic feet per minute (CFM) to form a fluidized bed of the catalyst, and the heater was activated to maintain a consistent temperature in all regions/zones within the quartz tube of 700° C. The product gas was cooled by submerging a product gas portion of the reactor in a chilled water bath. The product gas was then analyzed for hydrogen ($H_2$) and methane ($CH_4$) gas content after 5, 10, 15, 30, and 60 minutes to determine a relationship between the surface area of the reactor and the flow rate for a conventional fluidized bed. The results are given in Table 1 below.

TABLE 1

| Inlet gas ($CH_4$) | | Time | Outlet gas | | | | Conversion |
|---|---|---|---|---|---|---|---|
| CFM | Mol/min | (min) | Total CFM | Mol $CH_4$/min | Mol $H_2$/min | Total mol/min | (%) |
| 1 | 1.265 | 5 | 1.29 | 0.892 | 0.746 | 1.638 | 29 |
| | | 10 | 1.34 | 0.835 | 0.860 | 1.695 | 34 |
| | | 15 | 1.40 | 0.759 | 1.012 | 1.771 | 40 |
| | | 30 | 1.37 | 0.797 | 0.936 | 1.733 | 37 |
| | | 60 | 1.33 | 0.847 | 0.835 | 1.682 | 33 |
| 2 | 2.529 | 5 | 2.46 | 1.948 | 1.163 | 3.111 | 23 |
| | | 10 | 2.54 | 1.846 | 1.366 | 3.212 | 27 |
| | | 15 | 2.60 | 1.770 | 1.518 | 3.288 | 30 |
| | | 30 | 2.48 | 1.922 | 1.214 | 3.136 | 24 |
| | | 60 | 2.38 | 2.048 | 0.962 | 3.110 | 19 |
| 3 | 3.794 | 5 | 3.36 | 3.339 | 0.911 | 4.249 | 12 |
| | | 10 | 3.45 | 3.225 | 1.137 | 4.362 | 15 |
| | | 15 | 3.39 | 3.300 | 0.987 | 4.287 | 13 |
| | | 30 | 3.33 | 3.378 | 0.834 | 4.212 | 11 |
| | | 60 | 3.36 | 3.339 | 0.912 | 4.248 | 12 |

A number of variations and modifications of the disclosure can be used. It would be possible to provide for some features of the disclosure without providing others.

For example in one alternative embodiment, the inert gas curtain is provided by other nozzle or gas distribution system configurations, such as plural emitters positioned around a periphery of the conduit 512.

In another alternative embodiment, the gas distribution assembly comprises one or more gas distributors and rotates about a longitudinal axis of the reactor and/or gas impermeable structure.

In another alternative embodiment, the reactor assembly is used as a fluidized bed reactor for other chemical processes and reactions, such as in the petroleum and chemical processing industries. For example, the fluidized bed reactor can be used for cracking and reforming of hydrocarbons (oil), carbonization and gasification of coal, ore roasting, Fischer-Tropsch synthesis, polyethylene manufacturing, limestone calcining, aluminum anhydride production, granulation, vinyl-chloride production, combustion of waste, nuclear fuel preparation, combustion of solid, liquid and gaseous fuels, drying, adsorption, cooling, heating, freezing, conveying, storing and thermal treating of various particulate solid materials.

In another alternative embodiment, the cone can have other geometrical configurations. Examples comprise frustoconical, triangular prism, rectangular-based pyramid, tetrahedron, cylindrical prism, sphere, rectangular prism, pentagonal prism, hexagonal prism, octagonal prism, other polygonal prisms, and other volumetric shapes configured to provide vortex gas flow. The sidewalls of the prism or other volumetric shape can be tapered to provide for more turbulent vortex gas flow.

The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A rotating media fluidized bed reactor system comprising:

an inlet for a hydrocarbon-containing gas;

a gas impermeable structure comprising a continuous sidewall and hollow interior volume to receive the hydrocarbon-containing gas;

plural gas distributors positioned around a periphery of the gas impermeable structure and in fluid communication with the hollow interior volume to receive at least most of the hydrocarbon-containing gas from the hollow interior volume and discharge the hydrocarbon-containing gas in a reaction zone located exteriorly to the gas impermeable structure to create a vortex fluid flow, the reaction zone comprises suspended catalyst particles to cause decomposition of hydrocarbons in the hydrocarbon-containing gas to form a carbonaceous material; and an exit gas conduit to receive a reacted gas, the exit gas conduit having an inlet positioned substantially at an axis of the vortex fluid flow.

2. The reactor system of claim 1, wherein a hydrocarbon in the hydrocarbon-containing gas catalytically decomposes into carbon nanofibers and hydrogen gas, wherein the plural gas distributors are substantially stationary, and wherein the plural gas distributors each comprises an angled ramp surface to direct the discharged hydrocarbon-containing gas along a path of flow transverse to a central axis of the reactor.

3. The reactor system of claim 1, wherein the continuous sidewall is arcuate and wherein the gas impermeable structure comprises a cone centered about a longitudinal axis of a reactor cylindrical sidewall.

4. The reactor system of claim 1, wherein each of the plural gas distributors comprises an inlet and outlet and a passage interconnecting the inlet and outlet, the outlet being on a substantially vertical surface, and wherein the passage comprises an arcuate central axis.

5. The reactor system of claim 1, wherein a pressure of the hydrocarbon-containing gas ranges from about 50 to about 50,000 Pa, wherein a first velocity of the hydrocarbon-containing gas in the hollow interior volume ranges from about 0.5 to about 20 fps a second velocity of the hydrocarbon-containing gas upon discharge from each of the plural gas distributors ranging from about 0.5 to about 20 fps, and wherein a third velocity of the hydrocarbon-containing gas in the reaction zone ranges from about 0.5 to about 20 fps, wherein a temperature of the hydrocarbon-containing gas in the reaction zone ranges from about 550 to about 850° C., wherein a $P_{90}$ size of particulate catalyst particles ranges from about 0.1 to about 5 microns, wherein the gas impermeable structure is a cone, and wherein a ratio of a height (H) of the cone versus a cone diameter (D) ranges from about 1:1 to about 6:1.

6. The reactor system of claim 1, wherein, in a first mode, the gas impermeable structure is in a first position that is hermetically sealed to enable catalytic decomposition of hydrocarbons and, in a second mode, the gas impermeable structure is in a different second position that is not hermetically sealed to enable removal of carbonaceous material from the reaction zone.

7. The reactor system of claim 1, further comprising a gas curtain generator positioned at the inlet to the exit gas conduit to discharge a curtain gas in a direction of flow transverse to a direction of flow of the reacted gas to reduce a velocity of the reacted gas and substantially inhibit entry of entrained catalyst particles into the exit gas conduit.

8. A method comprising:

introducing a hydrocarbon-containing gas into an inlet of a rotating media fluidized bed reactor, the rotating media fluidized bed reactor comprising:

a gas impermeable structure comprising a continuous sidewall and hollow interior volume to receive the hydrocarbon-containing gas; and a gas distributor positioned at a periphery of the gas impermeable structure and in fluid communication with the hollow interior volume to receive at least most of the hydrocarbon-containing gas from the hollow interior volume and discharge the hydrocarbon-containing gas into a reaction zone located exteriorly to the gas impermeable structure to create a vortex fluid flow, the reaction zone comprising suspended catalyst particles to cause decomposition of hydrocarbons in the hydrocarbon-containing gas to form a carbonaceous material;

removing a reacted gas from an exit gas conduit of the reactor; and removing a composite material comprising carbonaceous product and catalyst particles from the reactor.

9. The method of claim 8, wherein the continuous sidewall is arcuate, wherein a hydrocarbon in the hydrocarbon-containing gas catalytically decomposes into carbon nanofibers and hydrogen gas, wherein the gas distributor comprises plural substantially stationary gas distributors positioned substantially uniformly around the periphery of the gas impermeable structure, wherein the gas distributor comprises an angled ramp surface to direct the discharged hydrocarbon-containing gas along a path of flow transverse to a central axis of the reactor and tangential to the continuous sidewall of the gas impermeable structure.

10. The method of claim 8, wherein the gas impermeable structure comprises a polygonal prism and wherein the continuous sidewall is a surface of the polygonal prism, and wherein the polygonal prism is substantially centered about a longitudinal axis of a reactor cylindrical sidewall.

11. The method of claim 8, wherein the gas distributor comprises plural substantially stationary gas distributors positioned substantially uniformly around the periphery of the gas impermeable structure, wherein each of the gas distributor comprises an inlet and outlet and a passage interconnecting the inlet and outlet and wherein the passage comprises an arcuate central axis.

12. The method of claim 8, wherein a pressure of the hydrocarbon-containing gas ranges from about 50 to about 50,000 Pa, wherein a first velocity of the hydrocarbon-containing gas in the hollow interior volume ranges from 0.5 to about 20 fps, a second velocity of the hydrocarbon-containing gas upon discharge from the gas distributor ranging from about 0.5 to about 20 fps, and wherein a third velocity of the hydrocarbon-containing gas in the reaction zone ranges from about 0.5 to about 20 fps, wherein a temperature of the hydrocarbon-containing gas in the reaction zone ranges from about 550 to about 850° C., wherein a $P_{90}$ size of particulate catalyst particles ranges from about 0.1 to about 5 microns, wherein the gas impermeable structure is a cone, and wherein a ratio of a height (H) of the cone versus a cone diameter (D) ranges from about 1:1 to about 6:1.

13. The method of claim 8, wherein the removing of the composite material comprises:

moving the gas impermeable structure from a first position that is hermetically sealed to enable catalytic decomposition of hydrocarbons to a different second position that is not hermetically sealed to enable removal of composite material from the reaction zone.

14. The method of claim 8, further comprising:

during the introducing, discharging a curtain gas in a direction of flow transverse to a direction of flow of the reacted gas to reduce a velocity of the reacted gas and substantially inhibit entry of entrained catalyst particles into the exit gas conduit; and during the introducing, rotating the gas distributor around a longitudinal axis of the gas impermeable structure;

separating the carbonaceous material from the catalyst particles to form a carbonaceous product; and recycling the catalyst particles to the introducing.

15. A rotating media fluidized bed reactor comprising:

an inlet for a hydrocarbon-containing gas;

a gas impermeable structure comprising a continuous sidewall and hollow interior volume to receive the hydrocarbon-containing gas;

a gas distributor positioned near a periphery of the gas impermeable structure and in fluid communication with the hollow interior volume to receive at least most of the hydrocarbon-containing gas from the hollow interior volume and discharge the hydrocarbon-containing gas in a reaction zone located exteriorly to the gas impermeable structure to create a vortex fluid flow, the reaction zone comprises suspended catalyst particles to cause decomposition of hydrocarbons in the hydrocarbon-containing gas to form a carbonaceous material; and an exit gas conduit to receive a reacted gas, the exit gas conduit having an inlet positioned substantially at an axis of the vortex fluid flow.

16. The reactor of claim 15, wherein the gas impermeable structure comprises a polygonal prism, wherein the continuous sidewall is a surface of the polygonal prism, wherein a hydrocarbon in the hydrocarbon-containing gas catalytically decomposes into carbon nanofibers and hydrogen gas, wherein the gas distributor is rotatable about a longitudinal axis of the gas impermeable structure, and wherein the gas distributor comprises an angled ramp surface to direct the discharged hydrocarbon-containing gas along a path of flow transverse to a central axis of the reactor.

17. The reactor of claim 15, wherein the continuous sidewall is arcuate and wherein the gas impermeable structure comprises a cone centered about a longitudinal axis of a reactor cylindrical sidewall.

18. The reactor of claim 15, wherein the gas distributor comprises plural substantially stationary gas distributors positioned substantially uniformly around the periphery of the gas impermeable structure, wherein each of the gas distributor comprises an inlet and outlet and a passage interconnecting the inlet and outlet, the outlet being on a substantially vertical surface, and wherein the passage comprises an arcuate central axis.

19. The reactor of claim 1, wherein a pressure of the hydrocarbon-containing gas ranges from about 50 to about 50,000 Pa, wherein a first velocity of the hydrocarbon-containing gas in the hollow interior volume ranges from about 0.5 to about 20 fps, a second velocity of the hydrocarbon-containing gas upon discharge from each of the plural gas distributors ranging from about 0.5 to about 20 fps, and wherein a third velocity of the hydrocarbon-containing gas in the reaction zone ranges from about 0.5 to about 20 fps, wherein a temperature of the hydrocarbon-containing gas in the reaction zone ranges from about 550 to about 850° C., wherein a $P_{90}$ size of particulate catalyst particles ranges from about 0.1 to about 5.0 microns, wherein the gas impermeable structure is a cone, and wherein a ratio of a height (H) of the cone versus a cone diameter (D) ranges from about 1:1 to about 6:1.

20. The reactor of claim 1, wherein, in a first mode, the gas impermeable structure is in a first position that is hermetically sealed to enable catalytic decomposition of hydrocarbons and, in a second mode, the gas impermeable structure is in a different second position that is not hermetically sealed to enable removal of carbonaceous material from the reaction zone.

21. The reactor of claim 1, further comprising a gas curtain generator positioned at the inlet to the exit gas conduit to discharge a curtain gas in a direction of flow transverse to a direction of flow of the reacted gas to reduce a velocity of the reacted gas and substantially inhibit entry of entrained catalyst particles into the exit gas conduit.

* * * * *